US012771970B2

(12) United States Patent
Ishikawa et al.

(10) Patent No.: US 12,771,970 B2
(45) Date of Patent: Oct. 20, 2026

(54) MEASUREMENT SYSTEM, DIAGNOSTIC SYSTEM, AND DETECTION SWITCH

(71) Applicant: Saginomiya Seisakusho, Inc., Tokyo (JP)

(72) Inventors: Takuro Ishikawa, Sayama (JP); Hiroyuki Mitsuya, Sayama (JP); Hisayuki Ashizawa, Sayama (JP); Tatsuya Tanaka, Sayama (JP)

(73) Assignee: SAGINOMIYA SEISAKUSHO, INC., Tokyo (JP)

( * ) Notice: Subject to any disclaimer, the term of this patent is extended or adjusted under 35 U.S.C. 154(b) by 1176 days.

(21) Appl. No.: 17/781,764

(22) PCT Filed: Dec. 4, 2020

(86) PCT No.: PCT/JP2020/045313
§ 371 (c)(1),
(2) Date: Jun. 2, 2022

(87) PCT Pub. No.: WO2021/112241
PCT Pub. Date: Jun. 10, 2021

(65) Prior Publication Data

US 2023/0016134 A1 Jan. 19, 2023

(30) Foreign Application Priority Data

Dec. 6, 2019 (JP) ................................ 2019-221404
Jan. 31, 2020 (JP) ................................ 2020-015377

(51) Int. Cl.
*F03G 7/08* (2006.01)
*G01F 1/20* (2006.01)
(Continued)

(52) U.S. Cl.
CPC ................ *H04Q 9/00* (2013.01); *F03G 7/08* (2013.01); *G01F 1/20* (2013.01); *G01K 5/56* (2013.01);
(Continued)

(58) Field of Classification Search
CPC .... G01F 1/20; G01F 1/28; F03G 7/08; G01K 5/56; G01L 9/0041; H02N 2/181;
(Continued)

(56) References Cited

U.S. PATENT DOCUMENTS

2004/0078662 A1 4/2004 Hamel et al.
2007/0114422 A1 5/2007 Berkcan et al.
(Continued)

FOREIGN PATENT DOCUMENTS

CN 105450079 A 3/2016
JP 2017022508 A * 1/2014 ............ G08C 15/06
(Continued)

OTHER PUBLICATIONS

Extended European Search Report, EP 20895668, Oct. 20, 2023.
EP 20895668.0, Communication pursuant to Article 94(3) EPC, Jul. 24, 2024.

*Primary Examiner* — Anthony W Megna Fuentes
(74) *Attorney, Agent, or Firm* — The Webb Law Firm

(57) ABSTRACT

A measurement system includes: a vibration-driven energy harvesting unit that generates electric power from sound, vibration, or displacement; a power supply controller that controls an amount of power consumption of a power supply based on the electric power generated by the vibration-driven energy harvesting unit; a detector that is driven by electric power supplied by the power supply controller and detects an environment state quantity; and a transmitter that is driven by electric power supplied by the power supply
(Continued)

controller and transmits information regarding the environment state quantity detected by the detector.

19 Claims, 13 Drawing Sheets

(51) Int. Cl.

| | |
|---|---|
| ***G01K 5/56*** | (2006.01) |
| ***G01L 9/00*** | (2006.01) |
| ***H02J 50/00*** | (2016.01) |
| ***H02N 2/18*** | (2006.01) |
| ***H04Q 9/00*** | (2006.01) |
| *G01F 1/28* | (2006.01) |
| *H02J 9/00* | (2006.01) |

(52) U.S. Cl.
CPC ........... *G01L 9/0041* (2013.01); *H02N 2/181* (2013.01); *H02N 2/186* (2013.01)

(58) Field of Classification Search
CPC H02N 2/186; H02J 9/005; H02J 50/00; H02J 50/001; H02J 50/005; H04Q 9/00
See application file for complete search history.

(56) References Cited

U.S. PATENT DOCUMENTS

| | | | |
|---|---|---|---|
| 2015/0128733 | A1 | 5/2015 | Taylor et al. |
| 2016/0285391 | A1 | 9/2016 | Asanuma et al. |

FOREIGN PATENT DOCUMENTS

| | | | | | |
|---|---|---|---|---|---|
| JP | 2014215631 | A | | 11/2014 | |
| JP | 2016208067 | A | | 12/2016 | |
| JP | 2018190053 | A | * | 11/2018 | ............. G08C 15/00 |
| WO | 2014148371 | A1 | | 9/2014 | |

* cited by examiner

MEASUREMENT SYSTEM, DIAGNOSTIC SYSTEM, AND DETECTION SWITCH

CROSS-REFERENCE TO RELATED APPLICATIONS

This application is the United States national phase of International Application No. PCT/JP2020/045313 filed Dec. 4, 2020, and claims priority to Japanese Patent Application Nos. 2019-221404 filed Dec. 6, 2019, and 2020-015377 filed Jan. 31, 2020, the disclosures of which are hereby incorporated by reference in their entirety.

BACKGROUND OF THE INVENTION

Field of the Invention

The present disclosure relates to a measurement system, a diagnostic system, and a detection switch.

Description of Related Art

A system that monitors equipment such as social infrastructures placed at remote locations without humans in attendance and transmits a result of the monitoring through wireless communication or the like has been proposed. In order to reduce power consumption, such a conventional system achieves power saving by reducing power consumption in a standby state where monitoring is not performed when compared with an operating state where the monitoring is performed (see Patent Literature 1).

CITATION LIST

Patent Literature

Patent Literature 1: Japanese Patent Laid-Open No. 2016-208067

SUMMARY OF INVENTION

In the system of Patent Literature 1, the system is brought from the standby state into the operating state by receiving a signal every predetermined time period or from the outside. It is therefore necessary in the standby state to continue supply of electric power all the time to a circuit unit for receiving the signal from the outside, and it is difficult to reduce power consumption in the standby state considerably.

According to a first aspect of the present disclosure, a measurement system includes: a vibration-driven energy harvesting unit that generates electric power from sound, vibration, or displacement; a power supply controller that controls an amount of power consumption of a power supply based on the electric power generated by the vibration-driven energy harvesting unit; a detector that is driven by electric power supplied by the power supply controller and detects an environment state quantity; and a transmitter that is driven by electric power supplied by the power supply controller and transmits information regarding the environment state quantity detected by the detector.

According to a second aspect of the present disclosure, a diagnostic system includes: the measurement system according to the first aspect that is disposed in a vicinity of a diagnosis object; and a receiving system that receives a signal transmitted from the measurement system and diagnoses a status of the diagnosis object based on the signal.

According to a third aspect of the present disclosure, a detection switch includes: a vibration detector that generates an electric signal in accordance with sound, vibration, or displacement; and a detecting unit that detects whether an output of the electric signal generated by the vibration detector is greater than a predetermined value or equal to or less than the predetermined value.

According to the present disclosure, it is possible to reduce the power consumption of the measurement system in the standby state considerably.

DETAILED DESCRIPTION OF THE INVENTION (Measurement System in First Embodiment)

Figure 1:
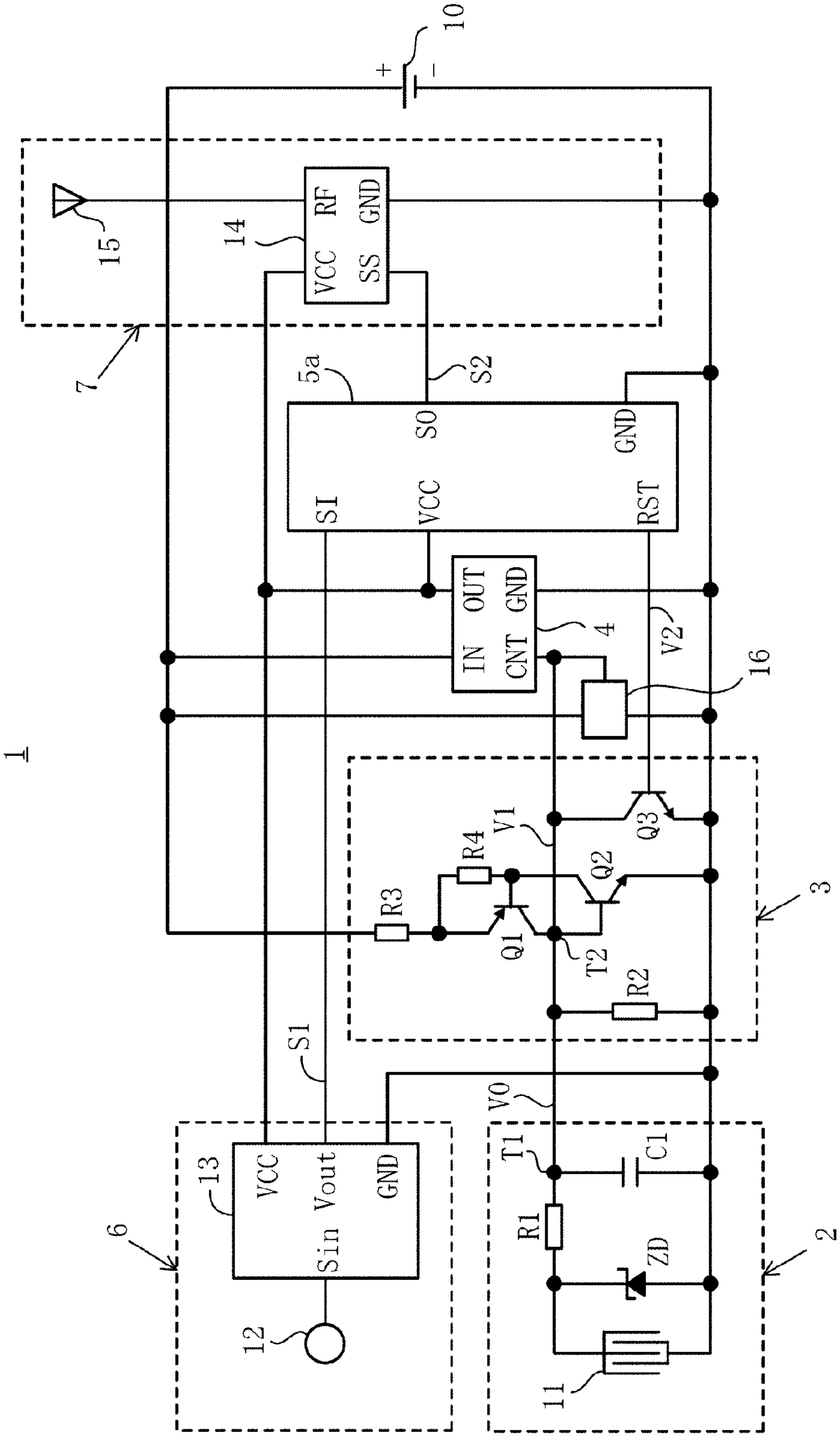
FIG. 1 is a diagram illustrating a schematic configuration of a measurement system according to a first embodiment.

A measurement system 1 according to a first embodiment will be described below with reference to FIG. 1 and FIG. 2. FIG. 1 is a diagram illustrating a schematic configuration of the measurement system 1 according to the first embodiment. The measurement system 1 includes a vibration-driven energy harvesting unit 2 that generates electric power from sound or vibration, a power supply controller 4 that controls an amount of power consumption of a power supply 10, a detector 6 that detects an environment state quantity S1, a transmitter 7 that transmits information regarding the environment state quantity detected by the detector 6, and the like.

The power supply 10 is a power supply such as a battery that supplies, in a form of electric energy, energy stored internally without supply of electric power from the outside.

The measurement system 1 further includes a signal processor 5*a* that calculates predetermined information based on the environment state quantity (a first signal S1) detected by detector 6 and conveys the information to the transmitter 7 in a form of a second signal S2.

The power supply controller 4 controls supply of electric power from the power supply 10 to the detector 6, the transmitter 7, and the signal processor 5*a*, that is, controls the amount of power consumption of the power supply 10, based on the electric power generated by the vibration-driven energy harvesting unit 2.

The measurement system 1 further includes a holding circuit 3 that receives an output voltage V0 of the vibration-driven energy harvesting unit 2 and outputs a first control signal V1 to the power supply controller 4.

The detector 6 is, as an example, a sound detector detecting sound, one of environment state quantities of an environment in which the measurement system 1 is placed, and includes a sensor 12 such as a microphone that converts vibration of sound into an electric signal and a detection circuit 13. The detection circuit 13 is, as an example, a circuit including an amplifying element such as a transistor and a difference amplifier. The detection circuit 13 receives an analog signal output from the sensor 12 through an SIN terminal, performs processing such as amplification on the signal, and outputs the analog signal subjected to the processing through a terminal Vout as a first signal S1. The detection circuit 13 includes a terminal VCC through which electric power output from an output terminal OUT of the power supply controller 4 is supplied and includes a GND terminal that is connected to a negative side of the power supply 10 serving as the ground.

The signal processor 5*a* is, as an example, a semiconductor integrated circuit such as a microcontroller that includes an analog/digital converter and performs predetermined signal processing on a digital signal converted into. The signal processor 5*a* includes an input terminal SI that is connected to the terminal Vout of the detector 6, and the first signal S1 output from the terminal Vout of the detector 6 is input into the input terminal SI of the signal processor 5*a*. The signal processor 5*a* includes a terminal VCC that is supplied with the electric power output from the output terminal OUT of the power supply controller 4 and includes a GND terminal that is connected to the ground.

The first signal S1 input into the input terminal SI of the signal processor 5*a* is converted from its analog signal into a digital signal (A/D conversion) by the signal processor 5*a*. Further, based on the first signal subjected to the A/D conversion by the signal processor 5*a*, signal processing such as detecting a magnitude, e.g., a sound pressure level, of a sound detected by the sensor 12, calculating a frequency spectrum of the sound, and calculating the number of occurrences of sounds or an interval of occurrences of sounds is performed. Information regarding a magnitude of sound extracted from a first signal S1 by the signal processing or regarding a frequency spectrum of the sound is output from an output terminal SO of the signal processor 5*a* in a form of a second signal S2 being digital.

The signal processor 5*a* performs the signal processing described above according to a program stored in a ROM or the like, which is not illustrated.

It should be noted that the signal processing also includes processing that performs A/D conversion from a first signal S1 being analog into a second signal S2 being digital, and therefore, the second signal S2 may be a signal that is obtained by simply subjecting the first signal S1 to the A/D conversion.

The transmitter 7 includes a communication circuit 14 and an antenna 15. The communication circuit 14 is, as an example, a communication circuit including an amplifying element such as a transistor, an oscillation element, and a frequency selective filter element such as a SAW device. The communication circuit 14 includes a terminal VCC that is supplied with the electric power output from the output terminal OUT of the power supply controller 4 and includes a GND terminal that is connected to the ground.

The communication circuit 14 includes an input terminal SS that is connected to the output terminal SO of the signal processor 5*a*, and into the input terminal SS, a second signal S2 output from the output terminal SO of the signal processor 5*a* is input. The communication circuit 14 modulates the second signal S2 input from the input terminal SS into a modulated signal that is suitable for wireless transmission from the antenna 15, amplifies the modulated signal, and output the amplified modulated signal from its RF terminal to the antenna 15. The modulated signal modulated based on the second signal is transmitted from the antenna 15 to the outside.

It should be noted that when information regarding a magnitude of sound extracted from a first signal S1 by the signal processing and information regarding a frequency spectrum of the sound both fall within their respective normal ranges, which are predetermined, the signal processor 5*a* may transmit, instead of the second signal S2, a signal conveying that the transmission is not needed, to the communication circuit 14. The communication circuit 14 receiving the signal conveying that the transmission is not needed does not perform transmission to the outside.

The power supply controller 4 is, as an example, a power supply control element such as a MOS-FET integrated circuit. The power supply controller 4 includes a power supply terminal IN that is connected to a positive side of the power supply 10, includes an earth terminal GND that is connected to the ground, and is thus supplied with electric power from the power supply 10. The power supply controller 4 includes a control terminal CNT that receives a first control signal V1 to be described later, and when a voltage of the first control signal V1 input into the control terminal CNT is higher than a first voltage serving as a threshold voltage, the power supply controller 4 outputs the electric power from the power supply 10 to the output terminal OUT. In contrast, when the first control signal V1 is equal to or lower than the first voltage, the power supply controller 4 interrupts the supply of the electric power to the output terminal OUT.

A value of the first voltage can be set at, as an example, any value from +0.2 V to +2 V with respect to the ground.

It should be noted that the threshold voltage of the first control signal V1 for the power supply controller 4 to interrupt the supply of the electric power from the power supply 10 to the output terminal OUT may be set to be lower than a threshold voltage of the first control signal V1 for the power supply controller 4 to start the supply of the electric power from the power supply 10 to the output terminal OUT. That is, controls of the supply and the interruption of the electric power by the power supply controller 4 may exhibit hysteresis for the value of the first control signal V1.

As described above, the measurement system 1 can transmit, to the outside, information regarding an environment state quantity detected by the detector 6 such as sound in an operating state where the power supply controller 4 is supplying the electric power from the power supply 10 to the detector 6, the signal processor 5*a*, and the transmitter 7.

In order to allow the detection and the transmission to be performed for an extended period of time with a limited electric power stored in the power supply 10 by reducing consumption of electric power stored in the power supply 10, a power consumption in a standby state, which is not the operating state, is desirably reduced as much as possible.

The measurement system 1 in the first embodiment is a measurement system that transmits, to the outside, information regarding sound that is an environment state quantity and detected by the detector 6. Accordingly, if there is no sound to be measured in an environment where the measurement system 1 is placed, the measurement system 1 need not operate and is only required to maintain a standby state, which is power saving. It is only required that the measurement system 1 switch from the standby state to the operating state when a sound to be measured then occurs in an environment where the measurement system 1 is placed.

To this end, the measurement system 1 in the first embodiment includes, as an event sensor that detects a sound to be measured, the vibration-driven energy harvesting unit 2 that generates electric power from sound or vibration without consuming the electric power from the power supply 10 and outputs a signal using the generated electric power. Upon detecting a sound to be measured, the vibration-driven energy harvesting unit 2 generates electric power by itself using energy of the sound and outputs, to the power supply controller 4 described above, a first control signal V1 of which a voltage is higher than the first voltage. Receiving this first control signal V1, the power supply controller 4 starts supplying the electric power from the power supply 10 to the detector 6, the signal processor 5*a*, and the transmitter 7.

In contrast, when there is no sound to be measured in the environment, an amount of power generation by the vibration-driven energy harvesting unit 2 is small, and the voltage of the first control signal V1 to be output to the power supply controller 4 is equal to or lower than the first voltage. The power supply controller 4 thus reduces an amount of electric power supplied from the power supply 10 to the detector 6, the signal processor 5*a*, and the transmitter 7 or interrupts the supply of the electric power, which brings the measurement system 1 into the standby state. Also in the standby state, the vibration-driven energy harvesting unit 2 being the event sensor does not consume the electric power from the power supply 10.

The vibration-driven energy harvesting unit 2 includes, as an example, a vibration-driven energy harvesting element 11, a rectifying element ZD that is, as an example, a Zener diode, a resistor R1, and a capacitor C1. The vibration-driven energy harvesting element 11 is an element that generates electric power from sound or vibration existing in an environment, and the vibration-driven energy harvesting element 11 is, for example, an electret energy harvesting element, piezo energy harvesting element, an electromagnetic-induction energy harvesting element, or a magnetostriction energy harvesting element. All of these types of the vibration-driven energy harvesting element 11 generate an AC electric power with a frequency equal to a frequency of the sound or vibration.

The AC electric power generated by the vibration-driven energy harvesting element 11 is rectified by a rectifying circuit that includes the rectifying element ZD, the resistor R1, and the capacitor C1. One end of the vibration-driven energy harvesting element 11 is connected to the ground, and the other end is connected to a cathode of the rectifying element ZD and one end of the resistor R1. The other end of the resistor R1 is connected to one end of the capacitor C1, forming an output part T1. The other end of the capacitor C1 and an anode of the rectifying element ZD are connected to the ground. A voltage of the output part T1 is output as the output voltage V0 of vibration-driven energy harvesting unit 2. It should be noted that an upper limit of the output voltage V0 is limited by a yield voltage of the rectifying element ZD, which is a Zener diode.

The output voltage V0 of the vibration-driven energy harvesting unit 2 is input into an input-output part T2 of the holding circuit 3. The holding circuit 3 is constituted by, as an example, a latch circuit that includes a pnp transistor Q1 and an npn transistor Q2. A collector of the pnp transistor Q1 and a base of the npn transistor Q2 are connected to each other at a portion that serves as the input-output part T2. To the input-output part T2, one end of a resistor R2, of which the other end is connected to the ground, is also connected.

An emitter of the pnp transistor Q1 is connected to the positive side of the power supply 10 via a resistor R3. The emitter and a base of the pnp transistor Q1 are connected to each other via a resistor R4. An emitter of the npn transistor Q2 is connected to the ground, and a collector of the npn transistor Q2 is connected to the base of the pnp transistor Q1.

The input-output part T2 is further connected to the control terminal CNT of the power supply controller 4, and a voltage of the input-output part T2 is input into the control terminal CNT of the power supply controller 4, as the first control signal V1 described above.

The output voltage V0 of the vibration-driven energy harvesting unit 2 is input into the input-output part T2 of the holding circuit 3 and applied to the base of the npn transistor Q2. As an example, a second voltage that is a threshold voltage of the npn transistor Q2 is set to be substantially equal to the first voltage that is the threshold voltage of the power supply controller 4 described above. When the output voltage V0 does not exceed the second voltage, conductivity between the collector and the emitter of the npn transistor Q2 is not established. Thus, a voltage of the collector of the npn transistor Q2 is a voltage close to the voltage of the power supply 10. This voltage is then applied to the base of the pnp transistor Q1, and thus conductivity between the emitter and the collector of the pnp transistor Q1 is also not established.

As a result, the voltage of the first control signal V1, which is the voltage of the input-output part T2, is a voltage that is substantially the same as the output voltage V0 to be input into the holding circuit 3. Further, since the voltages of the output voltage V0 and the first control signal V1 do not exceed the second voltage and the first voltage, which is the threshold voltage of the power supply controller 4 as described above, the power supply controller 4 does not start the supply of the electric power from the power supply 10 even when the first control signal V1 is input into the control terminal CNT. As a result, the measurement system 1 maintains the standby state.

In contrast, when the output voltage V0 applied to the base of the npn transistor Q2 exceeds the second voltage, which is the threshold voltage of the npn transistor Q2, conductivity is established between the collector and the emitter of the npn transistor Q2. As a result, the voltage of the collector of the npn transistor Q2 becomes close to a voltage of the ground (0 V). This voltage is then applied to the base of the pnp transistor Q1, and thus conductivity is also established between the emitter and the collector of the pnp transistor Q1. As a result, the voltage of the input-output part T2 becomes close to the voltage of the power supply 10, and the voltage of the first control signal V1, which is the voltage of the input-output part T2, becomes equal to or higher than the output voltage V0 to be input into the holding circuit 3.

It should be noted that, in the holding circuit 3, resistance values of the resistors R2, R3, and R4 are set such that the voltage of the first control signal V1 becomes a voltage higher than the first voltage described above when the output voltage V0 exceeds the second voltage.

Accordingly, in a state where the output voltage V0 exceeds the second voltage, the voltage of the first control signal V1 input into the control terminal CNT also exceeds the first voltage, and the power supply controller 4 starts the supply of the electric power from the power supply 10 to the detector 6, the signal processor 5*a*, and the transmitter 7. As a result, the measurement system 1 is brought into the operating state.

In this state, even when the output voltage V0 of the vibration-driven energy harvesting unit 2 falls below the second voltage, the conducting state of the pnp transistor Q1 and the npn transistor Q2 in which conductivity has already been established is maintained, and thus the input-output part T2 is maintained at a voltage higher than the first voltage.

By the actions described above, unless the output voltage V0 of the vibration-driven energy harvesting unit 2 exceeds the second voltage, which is a predetermined voltage, the holding circuit 3 keeps outputting a voltage equal to or lower than the first voltage described above as the first control signal V1, and the measurement system 1 thus maintains the standby state.

In contrast, if the output voltage V0 of the vibration-driven energy harvesting unit 2 exceeds the second voltage even once, the holding circuit 3 keeps outputting a voltage higher than the first voltage as the first control signal V1 from this point onward, and the measurement system 1 thus maintains the operating state.

The holding circuit 3 further includes an npn transistor Q3 for resetting the voltage of the input-output part T2 to a voltage equal to or lower than the first voltage. A collector of the npn transistor Q3 is connected to the input-output part T2, and an emitter of the npn transistor Q3 is connected to the ground. Further, a base of the npn transistor Q3 is connected to a reset signal output terminal RST of the signal processor 5*a*.

The signal processor 5*a* outputs a second control signal V2 with a positive voltage from the reset signal output terminal RST at a predetermined timing after completion of the above-described signal processing and the transmission of the second signal S2 to the transmitter 7. When this second control signal V2 is input into the holding circuit 3, conductivity is established between the collector and the emitter of the npn transistor Q3, and thus the voltage of the input-output part T2 decreases to a voltage which is substantially the voltage of the ground (0 V). Thereby, conductivity between the collector and the emitter of the npn transistor Q2 is disestablished, following which the voltage of the base of the pnp transistor Q1 rises, and conductivity between the collector and the emitter of the pnp transistor Q1 is disestablished.

As a result, the voltage of the input-output part T2 and the voltage of the first control signal V1 decrease to a voltage being substantially the voltage of the ground (0 V). Receiving the first control signal V1 being equal to or lower than the first voltage through the control terminal CNT, the power supply controller 4 reduces an amount of the electric power supplied from the power supply 10 to the detector 6, the signal processor 5*a*, and the transmitter 7 or interrupts the supply of the electric power. This brings the measurement system 1 into the standby state.

The timing at which the signal processor 5*a* outputs the second control signal V2 may be determined with a program that controls the signal processor 5*a*. Alternatively, instead of the output of the second control signal V2 by the signal processor 5*a*, the transmitter 7 may transmit the second control signal V2 to the signal processor 5*a* when the transmitter 7 completes the transmission.

In a case where the signal processor 5*a* and the communication circuit 14 do not perform the transmission to the outside because the pieces of information extracted from the first signal S1 fall within the predetermined normal ranges as described above, the signal processor 5*a* may output the second control signal V2 when determining the extracted pieces of information fall within the predetermined normal ranges.

In a case where the measurement system 1 is to measure an object that produces a sound or vibration with a specific frequency, a vibration-driven energy harvesting unit 2 of which an electric power generation efficiency for sounds or vibrations of a predetermined frequency band including the frequency is enhanced so as to be higher than electric power generation efficiencies for sounds or vibrations with other frequencies may be used. Specifically, for example, a resonance frequency of the vibration-driven energy harvesting element 11 included in the vibration-driven energy harvesting unit 2 may be set within the predetermined frequency band including the frequency of the sound or vibration. Alternatively, a mechanical structure of the vibration-driven energy harvesting unit 2 itself may be made into a structure that produces resonance in the predetermined frequency band including the frequency.

In the above description, the holding circuit 3 is supposed to include bipolar transistors: the npn transistor and the pnp transistor, but nMOS transistor may be used in place of the npn transistor, and a pMOS transistor may be used in place of the pnp transistor.

In addition, the configuration of the holding circuit 3 is not limited to the configuration described above, and a well-known latch circuit having another configuration may be used. The holding circuit 3 may be a holding circuit including a photo diode.

In the above-described first embodiment, the power supply controller 4 and the signal processor 5*a* are supposed to be separate circuits, but the power supply controller 4 and the signal processor 5*a* may be formed as, for example, one monolithic or hybrid integrated circuit.

That is, a predetermined part of the one integrated circuit may constitute the power supply controller 4, and the other part may constitute the signal processor 5*a*.

The measurement system 1 may need to transmit information on an operation history and the like to the outside irrespective of presence of a sound being an environment state quantity of an environment where the measurement system 1 is placed, for example, periodically. Accordingly, the measurement system 1 includes a timer 16 including a timer IC and the like and is brought into the operating state at predetermined intervals by the timer 16 transmitting a signal with a voltage higher than the first voltage to the control terminal CNT of the power supply controller 4 at the predetermined intervals.

When the measurement system 1 is brought into the operating state by the signal from the timer 16, there is no sound to be detected in the environment where the measurement system 1 is placed, and therefore, a sound detected by the detector 6 is a sound with a magnitude that is smaller than a predetermined magnitude. Accordingly, for example, the signal processor 5*a* may determine whether a magnitude of a sound detected by the detector 6 is larger than the predetermined magnitude or not and may perform a process of transmitting information regarding the sound when the magnitude is larger than the predetermined magnitude.

In contrast, when the magnitude of the sound detected by the detector 6 is smaller than the predetermined magnitude, the signal processor 5*a* may perform a process of transmitting information on the operation history and the like to the outside. At this time, as a part of the information on the operation history and the like, information regarding a remaining amount of electric energy of the power supply 10 such as the voltage of the power supply 10 may be transmitted to the outside.

It should be noted that the timer 16 is supplied with electric power from the power supply 10 and consumes the electric power all the time in both the operating state and the standby state of the measurement system 1. However, the electric power consumed by the timer 16 is as very small as an electric power consumed by, for example, a watch and does not consume electric power stored in the power supply 10 significantly.

In a case where there is no need to bring the measurement system 1 into the operating state at the predetermined intervals, the timer 16 need not be provided.

(Measurement System in Second Embodiment)

Figure 2:
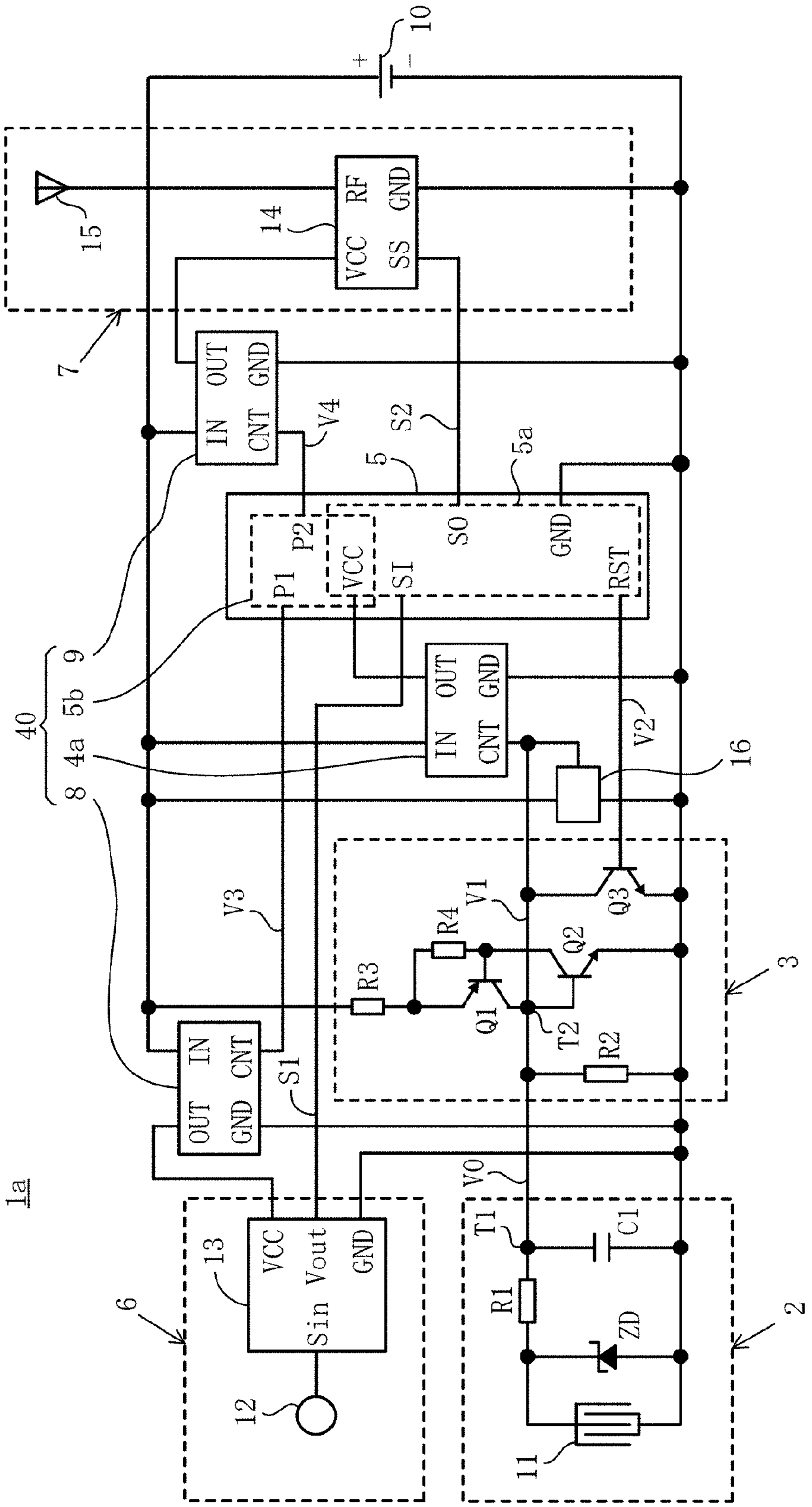
FIG. 2 is a diagram illustrating a schematic configuration of a measurement system according to a second embodiment.

FIG. 2 is a diagram illustrating a measurement system 1*a* according to a second embodiment. Many of components of the measurement system 1*a* in the second embodiment are common to those of the measurement system 1 in the first embodiment described above. Therefore, the common components will be denoted by the same reference characters, and the description thereof will be omitted as appropriate.

The measurement system 1*a* in the second embodiment includes a controller 5 that includes a signal processor 5*a* and a control signal generator 5*b* to be described later. A terminal VCC of the controller 5, which is a power supply terminal of the controller 5, is shared by the signal processor 5*a* and the control signal generator 5*b*. Supply of electric power from a power supply 10 to the terminal VCC of the controller 5 is directly controlled by a first power supply controller 4*a* based on an output voltage V0 from a vibration-driven energy harvesting unit 2.

In contrast, supply of electric power from the power supply 10 to a detector 6 and a transmitter 7 is controlled by a second power supply controller 8 and a third power supply controller 9 based on a third control signal V3 and a fourth control signal V4 from the control signal generator 5*b* of the controller 5, respectively. The second power supply controller 8 and the third power supply controller 9 each include a power supply terminal IN that receives the electric power from the power supply 10. The second power supply controller 8 controls supply of the electric power from the power supply 10 to the detector 6 based on the third control signal V3, which is output from a terminal P1 of the control signal generator 5*b* and input into a control terminal CNT of the second power supply controller 8. The third power supply controller 9 controls supply of the electric power from the power supply 10 to the transmitter 7 based on the fourth control signal V4, which is output from a terminal P2 of the control signal generator 5*b* and input into a control terminal CNT of the third power supply controller 9.

It should be noted that the first power supply controller 4*a*, the second power supply controller 8, and the third power supply controller 9 all may have the same configuration as the power supply controller 4 of the measurement system 1 in the first embodiment.

It can be said that, in the measurement system 1*a* in the second embodiment, the first power supply controller 4*a*, the second power supply controller 8, the third power supply controller 9, and the control signal generator 5*b* constitute a power supply controller 40, which is equivalent to the power supply controller 4 of the measurement system 1 in the first embodiment.

In the measurement system 1*a* in the second embodiment, the power supply controller 40 can control the supply of electric power from the power supply 10 to the detector 6, the transmitter 7, and the signal processor 5*a*, individually, based on the first control signal V1.

In the measurement system 1*a* in the second embodiment, when a sound, which is an environment state quantity, occurs around the measurement system 1*a*, the first power supply controller 4*a* starts the supply of the electric power from the power supply 10 to the controller 5. This brings the signal processor 5*a* and the control signal generator 5*b* in the controller 5 into their operating states. The control signal generator 5*b* is, as an example, a semiconductor integrated circuit such as a microcontroller. The control signal generator 5*b* includes a power supply terminal VCC that is shared as a power supply terminal VCC of the signal processor 5*a*, and the control signal generator 5*b* is supplied with an electric power with the same voltage as the electric power supplied to the signal processor 5*a*.

Receiving the supply of the electric power, the control signal generator 5*b* outputs the third control signal V3 and the fourth control signal V4 according to a program stored in a ROM or the like not illustrated. Receiving either the third control signal V3 or the fourth control signal V4, the second power supply controller 8 and the third power supply controller 9 output the electric power from the power supply 10 to their output terminals OUT, respectively.

As an example, when the control signal generator 5*b* receives the supply of the electric power from the first power supply controller 4*a* to be brought into the operating state, the control signal generator 5*b* first outputs the third control signal V3 to the second power supply controller 8 for a first period, which is predetermined, so as to cause the second power supply controller 8 to start the supply of the electric power from the power supply 10 to the detector 6.

When the signal processor 5*a* receives the supply of the electric power from the first power supply controller 4*a* to be brought into the operating state, the signal processor 5*a* performs signal processing on the first signal S1 output from the detector 6, as with the measurement system 1 in the first embodiment described above.

At a timing when the signal processing by the signal processor 5*a* is completed or a timing immediately before the completion, the control signal generator 5*b* outputs the fourth control signal V4 to the third power supply controller 9 for a second period, which is predetermined, so as to cause the third power supply controller 9 to start the supply of the electric power from the power supply 10 to the transmitter 7. By the transmitter 7 receiving the supply of the electric power to be brought into an operating state, the second signal S2 output from the signal processor 5*a* is received, modulated, and output to the outside.

When the first period is ended, the output of the third control signal V3 from the control signal generator 5*b* to the second power supply controller 8 is ended. This causes the second power supply controller 8 to reduce the amount of the electric power supplied from the power supply 10 to the detector 6 or to interrupt the supply of the electric power.

When the second period is ended, the output of the fourth control signal V4 from the control signal generator 5*b* to the third power supply controller 9 is ended. This causes the third power supply controller 9 to reduce the amount of the electric power supplied from the power supply 10 to the transmitter 7 or to interrupt the supply of the electric power.

The measurement system 1*a* in the second embodiment includes the control signal generator 5*b*, and the control signal generator 5*b* controls the timing for supplying, reducing, or interrupting the electric power from the power supply 10 to the detector 6 and the transmitter 7 with the second power supply controller 8 and the third power supply controller 9. The supply and the interruption of the electric power can be controlled more finely, such as not supplying the electric power to the transmitter 7 even when the detector 6 is operating and not supplying the electric power to the detector 6 even when the transmitter 7 is operating, as described above. It is thus possible to further reduce the power consumption of the measurement system 1*a*.

It should be noted that the signal processor 5*a* and the control signal generator 5*b* constituting the controller 5 may be formed on, for example, a single semiconductor integrated circuit or may be formed as separate semiconductor integrated circuits. The signal processor 5*a* and the control signal generator 5*b* may communicate with each other to share the various timings and the like described above.

(Measurement System in Third Embodiment)

Figure 3:
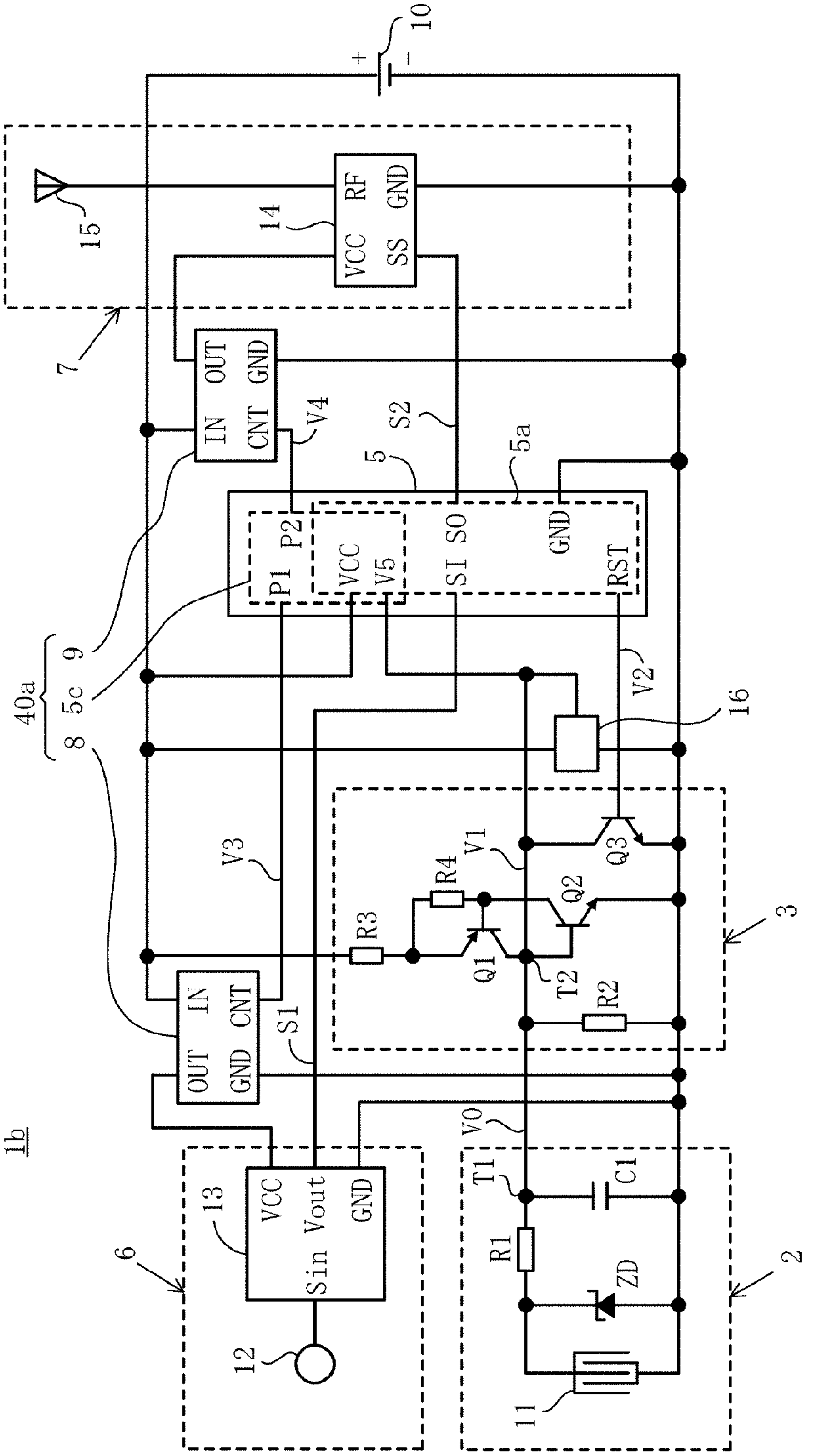
FIG. 3 is a diagram illustrating a schematic configuration of a measurement system according to a third embodiment.

FIG. 3 is a diagram illustrating a measurement system 1*b* according to a third embodiment. Many of components of the measurement system 1*b* in the third embodiment are common to those of the measurement system 1*a* in the second embodiment described above. Therefore, the common components will be denoted by the same reference characters, and the description thereof will be omitted as appropriate.

Unlike the measurement system 1*a* in the second embodiment, the measurement system 1*b* in the third embodiment does not include the first power supply controller 4*a*. In the measurement system 1*b* in the third embodiment, a control signal generator 5*c* included in a controller 5 has substantially the same function as that of the first power supply controller 4*a* in the second embodiment.

In the measurement system 1*b* in the third embodiment, electric power from a power supply 10 is directly input into a terminal VCC of the control signal generator 5*c*. Further, a first control signal V1 and an output signal from a timer 16 are input into a control terminal V5 of the control signal generator 5*c*.

When the first control signal V1 input into the control terminal V5 exceeds, as an example, the first voltage described above, the control signal generator 5*c* supplies the electric power supplied from the power supply 10 through the terminal VCC to the signal processor 5*a*. Then, as in the second embodiment described above, the control signal generator 5*c* outputs a third control signal V3 to a second power supply controller 8 at a predetermined timing for a predetermined first period, so as to cause the second power supply controller 8 to start supply of the electric power from the power supply 10 to a detector 6. Likewise, the control signal generator 5*c* outputs a fourth control signal V4 to a third power supply controller 9 at a predetermined timing for a predetermined second period, so as to cause the third power supply controller 9 to start supply of the electric power from the power supply 10 to a transmitter 7.

In contrast, when a voltage of the first control signal V1 is equal to or lower than the first voltage, the control signal generator 5*c* reduces or interrupts the supply of the electric power to the signal processor 5*a* to control the second power supply controller 8 and the third power supply controller 9, so that the supply of the electric power to the detector 6 and the transmitter 7 is reduced or interrupted.

Further, as in the second embodiment described above, when the first period and the second period are ended, the control signal generator 5*c* ends the output of the third control signal V3 and the fourth control signal V4, so as to cause the second power supply controller 8 to reduce or interrupt the supply of the electric power to the detector 6 and cause the third power supply controller 9 to reduce or interrupt the supply of the electric power to the transmitter 7.

It can be said that, in the measurement system 1*b* in the third embodiment, a control signal generator 5*c*, the second power supply controller 8, and the third power supply controller 9 constitute a power supply controller 40*a*, which is equivalent to the power supply controller 4 of the measurement system 1 in the first embodiment.

In the measurement system 1*b* in the third embodiment, the power supply controller 40*a* can control the supply of electric power from the power supply 10 to the detector 6, the transmitter 7, and the signal processor 5*a*, individually, based on the first control signal V1.

In the third embodiment described above, the control signal generator 5*c* is supposed to control the second power supply controller 8 and the third power supply controller 9 with the third control signal V3 and the fourth control signal V4, but this should not be construed as limiting the configuration.

For example, at least one of the second power supply controller 8 and the third power supply controller 9 need not be used, and the control signal generator 5*c* may control the supply of the electric power to at least one of the detector 6 and the transmitter 7 directly. To this end, for example, the second power supply controller 8 may be removed from the measurement system 1*b* in the third embodiment illustrated in FIG. 3, and the third control signal V3 output from the terminal P1 of the control signal generator 5*c* may be directly input into a terminal VCC of a detection circuit 13 of the detector 6. Likewise, the third power supply controller 9 may be removed from the measurement system 1*b*, and the fourth control signal V4 output from the terminal P2 of the control signal generator 5*c* may be directly input into a terminal VCC of a communication circuit 14 of the transmitter 7.

In these cases, each of the third control signal V3 and the fourth control signal V4 is supposed to supply electric power that is adequate for allowing the detector 6 or the transmitter 7 to operate, respectively. Further, it can be said in these cases that the control signal generator 5*c* constitutes the power supply controller 40*a*, which is equivalent to the power supply controller 4 of the measurement system 1 in the first embodiment.

It should be noted that, when the voltage of the first control signal V1 is equal to or lower than the first voltage, the control signal generator 5*c* may cause the signal processor 5*a*, as well as the control signal generator 5*c* itself alternatively, to operate in a low power consumption mode. The low power consumption mode is, for example, a mode in which the signal processor 5*a* and the like are caused to operate while their operating frequencies (clock frequencies) are decreased to equal to or lower than about 1/100 of the operating frequencies of a case where the voltage of the first control signal V1 exceeds the first voltage. By causing the signal processor 5*a* to operate in the low power consumption mode, the supply of the electric power to the signal processor 5*a* can be reduced.

It should be noted that any one of the measurement systems 1, 1*a*, and 1*b* in the first to third embodiments described above may be made to have a configuration in which at least one of the detector 6 or the transmitter 7 operates in the low power consumption mode in a state where the supply of the electric power from the power supply controller 4, the second power supply controller 8, the third power supply controller 9, or the control signal generator 5*c* is reduced.

In this case, when the first control signal V1 is equal to or lower than the first voltage, the power supply controllers 4, 40, and 40*a* reduce an amount of the electric power supplied from the power supply 10 to the detector 6, the transmitter 7, and the signal processor 5*a* to, for example, equal to or smaller than 1/10 of the amount of the electric power of a case where the first control signal V1 exceeds the first voltage. It is thus possible to further reduce the power consumption of the measurement systems 1, 1*a*, and 1*b* in the standby state. The amount of the electric power of the case where the first control signal V1 is equal to or lower than the first voltage may be further reduced to equal to or lower than 1/1000 of the amount.

In addition, the measurement systems 1*a* or 1*b* in the second embodiment or the third embodiment may be made to have a configuration in which the control signal generator 5*b* or 5*c* performs control such that at least one of the detector 6 or the transmitter 7 is driven in the low power consumption mode. To this end, the control signal generator 5*b* or 5*c* is to be connected to at least one of the detection circuit 13 of the detector 6 or the communication circuit 14 of the transmitter 7 via a control line not illustrated, and a control signal via the control line may set at least one of the detector 6 or the transmitter 7 to the low power consumption mode and may cancel the low power consumption mode.

Modifications of Vibration-Driven Energy Harvesting Unit

As a vibration-driven energy harvesting unit 2, an energy harvesting unit including a displacement-driven energy harvesting element, which produces an electromotive force from a displacement (deformation) of a piezoelectric element or the like, can be used.

Figure 4:
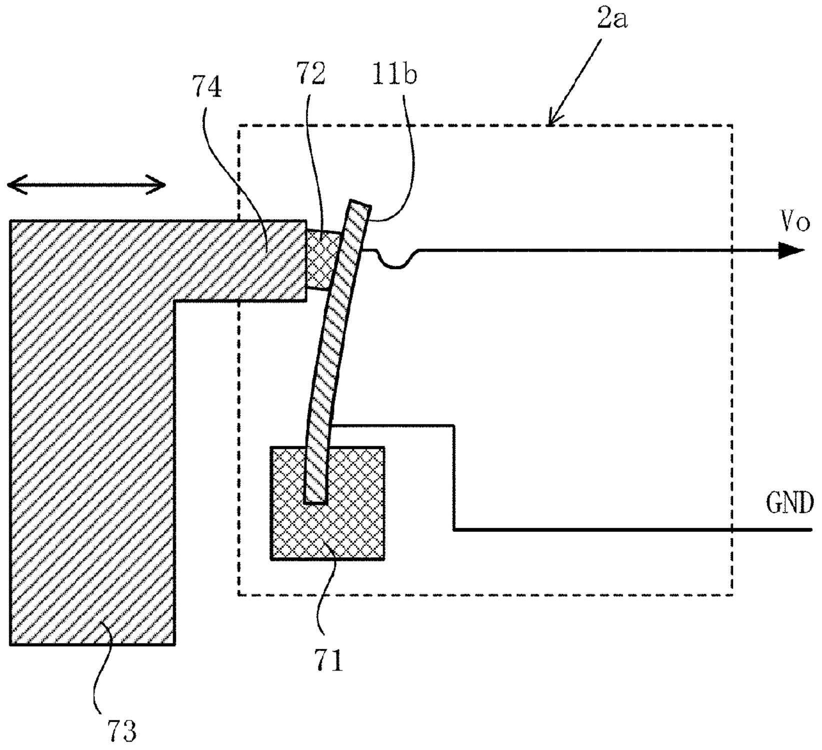
FIG. 4 is a diagram illustrating a modification of a vibration-driven energy harvesting unit.

FIG. 4 illustrates, as an example, a vibration-driven energy harvesting unit 2*a* in a modification that includes a displacement-driven energy harvesting element 11*b* including a sheet-shaped piezoelectric element. The displacement-driven energy harvesting element 11*b* includes one end that is fixed by a fixing part 71 and the other end in a vicinity of which a pressing part 72 is formed. Onto the pressing part 72, as an example, a protruding portion 74, which is a part of a measurement object 73 for the measurement system 1, abuts.

When the measurement object 73 undergoes displacement in a lateral direction in FIG. 4, the protruding portion 74 also undergoes displacement in the lateral direction, changing a displacement (deformation) state of the displacement-driven energy harvesting element 11*b*, so that the displacement-driven energy harvesting element 11*b* produces a DC electromotive force in accordance with an amount of the displacement (deformation). This DC electromotive force is output as an output voltage V0 of the vibration-driven energy harvesting unit 2.

As with the vibration-driven energy harvesting unit 2 described above, the vibration-driven energy harvesting unit 2*a* in the modification does not consume the electric power of the power supply 10 in the standby state, either.

Modification 1 of Measurement System in Each Embodiment

The measurement systems 1, 1*a*, and 1*b* in the first to third embodiments described above are all supposed to include the holding circuit 3, but the measurement systems 1, 1*a*, and 1*b* need not necessarily include the holding circuit 3.

In a case where the holding circuit 3 is not included, the output voltage V0 output from the vibration-driven energy harvesting unit 2 is input, as the first control signal, into the power supply controller 4 or the first power supply controller 4*a*.

The signal processor 5*a* or the control signal generator 5*b* can be made to function in place of the holding circuit 3. That is, the signal processor 5*a* or the control signal generator 5*b* is provided with a voltage output unit that outputs a voltage higher than the first voltage for a certain period of time when being supplied with electric power, and an output of the voltage output unit is input into the control terminal CNT of the power supply controller 4 or the first power supply controller 4*a*. This configuration can also bring the measurement systems 1, 1*a*, and 1*b* into the operating state for the certain period of time and then bring back to the standby state when the output voltage V0 output from the vibration-driven energy harvesting unit 2 once exceeds the first voltage being a threshold voltage.

Further, the voltage output unit that outputs the voltage higher than the first voltage for the certain period of time when being supplied with the electric power may be provided in the power supply controller 4 or the first power supply controller 4*a*.

Modification 2 of Measurement System in Each Embodiment

The measurement systems 1, 1*a*, and 1*b* in the first to third embodiments described above are each supposed to use, as the power supply 10, a power supply that supplies, in a form of electric energy, energy stored internally, but a power supply including an energy harvesting element can be used as the power supply 10.

Figure 5:
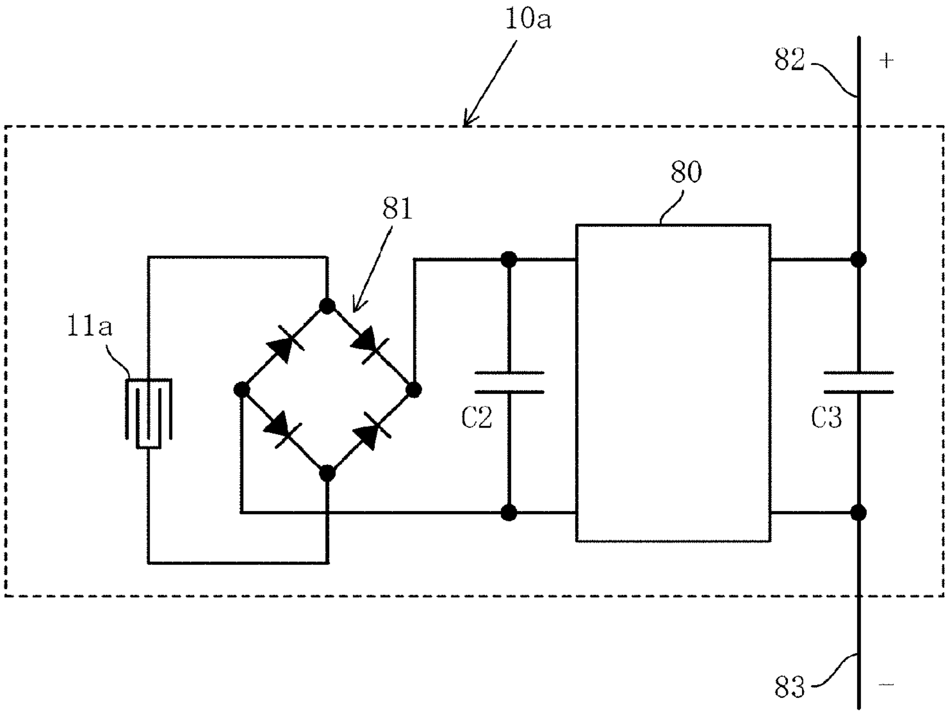
FIG. 5 is a diagram illustrating an example of a power supply including an energy harvesting device.

FIG. 5 is a diagram illustrating an example of a power supply 10*a* that includes an energy harvesting element 11*a*. The power supply 10*a* includes, as an example, the energy harvesting element 11*a* being a vibration-driven energy harvesting element, a rectifying circuit 81, a second capacitor C2, a voltage converter (DC/DC converter) 80, and an electricity storage C3. AC electric power generated by the energy harvesting element 11*a* is rectified by the rectifying circuit 81 and stored in the second capacitor C2. Then, a voltage of the AC electric power is converted by the voltage converter 80 and stored in the electricity storage C3.

The electric power stored in the electricity storage C3 is supplied to the measurement system 1, 1*a*, or 1*b* via conducting wires 82 and 83.

The electricity storage C3 may be a capacitor or may be a rechargeable battery (secondary battery).

Additionally, a battery (primary battery) may be provided parallel to the electricity storage C3. It should be noted that the primary battery need not be provided in a case where the power supply 10 includes the energy harvesting element 11*a* as in the above-described example.

Modification 3 of Measurement System in Each Embodiment

In the measurement systems 1, 1*a*, and 1*b* in the first to third embodiments described above, the transmitter 7 is supposed to transmit information to the outside using wireless communication, but the transmitter 7 may be configured to transmit information using wired communication.

Modification 4 of Measurement System in Each Embodiment

In the measurement systems 1, 1*a*, and 1*b* in the first to third embodiments described above, the detector 6 is supposed to detect sound as an environment state quantity, but the environment state quantity to be detected by the detector 6 is not limited to sound.

For example, the detector 6 may be configured to detect, as an environment state quantity, vibration, quantity of light, acceleration applied to the measurement systems 1, 1*a*, and 1*b* including gravitational acceleration, and the like. Alternatively, the detector 6 may be configured to detect surrounding circumstances of the measurement systems 1, 1*a*, and 1*b* in a form of image information.

In a case where the detector 6 is to detect accelerations in a plurality of directions, the signal processor 5*a* of the measurement system 1, 1*a*, or 1*b* can perform signal processing on a first signal S1 regarding the detected accelerations to detect an inclination state of the measurement system 1, 1*a*, or 1*b* and can transmit the inclination state as a second signal S2. In this case, the detector 6 functions as an attitude detector that detects an attitude of the detector 6.

Modification 5 of Measurement System in Each Embodiment

Figure 6:
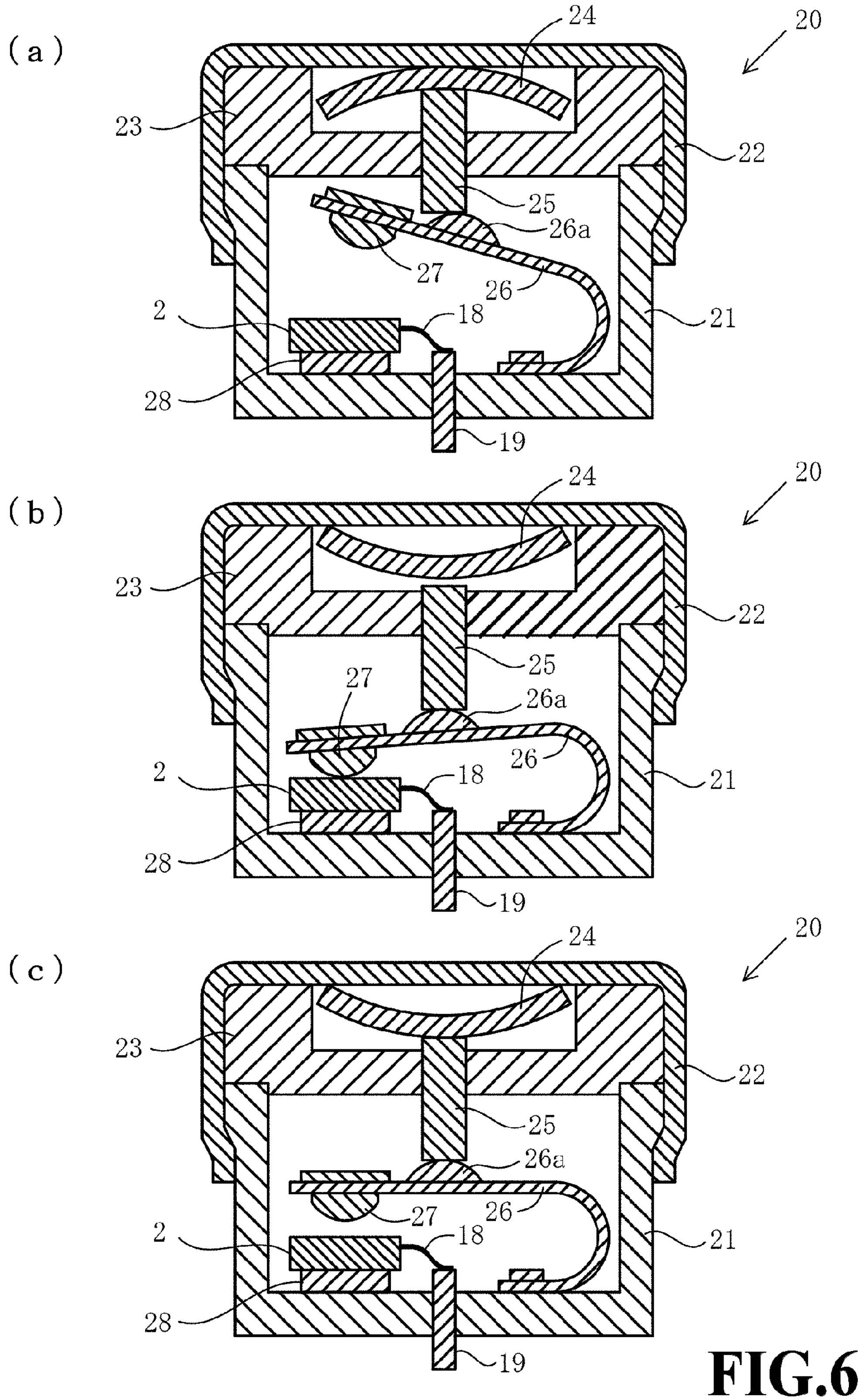
FIG. 6 is a diagram illustrating a schematic configuration of a modification 5 of the measurement system.

With reference to FIG. 6, a modification 5 of the measurement system in each of the first to third embodiments will be described. A measurement system in the modification 5 is different from the measurement systems 1, 1*a*, and 1*b* in the first embodiment, the second embodiment, the third embodiment and the modifications described above in that a vibration generator 20 is provided in a vicinity of the vibration-driven energy harvesting unit 2. However, the other respects are the same as the measurement systems 1, 1*a*, and 1*b* in the first embodiment, the second embodiment, the third embodiment and the modifications described above.

In FIG. 6, therefore, the measurement system is not illustrated entirely, and the vibration-driven energy harvesting unit 2 and the vibration generator 20 are illustrated.

As illustrated in FIG. 6, in the modification 5, the vibration-driven energy harvesting unit 2 is provided inside the vibration generator 20 that generates sound or vibration in accordance with temperature, which is an example of an environment state quantity.

The vibration generator 20 has a housing that includes a case 21, a cap 22, a guide 23, and the like and includes, inside the housing, the vibration-driven energy harvesting unit 2 and a bimetal (bimetallic disc) 24 in a disk shape as an example of a member that changes in shape with a temperature change to generate sound or vibration. The bimetal 24 is placed in a cavity formed by the cap 22 and the guide 23.

FIG. 6(*a*) illustrates the vibration generator 20 in a state of a relatively low temperature. At this time, the bimetal 24 warps to have a shape that is convex upward in FIG. 6(*a*). An operation pin 25 is disposed in such a manner as to penetrate a through hole provided in the guide 23, which is not illustrated. The operation pin 25 includes one end that is in contact generally with a center of the bimetal 24 and includes the other end that is in contact with a pressing part 26*a* of a spring member 26. A lower end of the spring member 26 is fixed to the case 21, and the pressing part 26*a* of the spring member 26 pushes the operation pin 25 upward with elastic force of the spring member 26.

FIG. 6(*b*) illustrates a moment when the bimetal 24 deforms due to a temperature rise, so as to invert the shape of the warp to a shape that is convex downward. An impulsive force that occurs with the inversion of the bimetal 24 travels through the operation pin 25 to the pressing part 26*a* of the spring member 26, causing a rapid elastic deformation of the spring member 26. As a result, a hammer 27 that is provided substantially at an end portion of the spring member 26 rapidly moves, striking the vibration-driven energy harvesting unit 2 from a top surface of the vibration-driven energy harvesting unit 2. The vibration-driven energy harvesting unit 2 is supported by the case 21 via an elastic body 28 that includes rubber or a spring, and the vibration-driven energy harvesting unit 2 vibrates by being struck by the hammer 27.

The vibration-driven energy harvesting unit 2 generates electric power from vibration or sound that occurs then. The generated electric power is output from the vibration-driven energy harvesting unit 2 via a wire 18 and a terminal 19 and is input into the holding circuit 3 or the power supply controllers 4 and 40 illustrated in FIG. 1 to FIG. 3. Then, based on the electric power generated by the vibration-driven energy harvesting unit 2, the measurement systems 1, 1*a*, and 1*b* illustrated in FIG. 1 to FIG. 3 are brought from the standby state into the operating state.

FIG. 6(*c*) illustrates a state after the hammer 27 strikes the vibration-driven energy harvesting unit 2. By the elastic force of the spring member 26, the hammer 27 provided on the spring member 26 is separated from the vibration-driven energy harvesting unit 2.

When an ambient temperature of the vibration generator 20 drops thereafter, the shape of the bimetal 24 returns to a state where the bimetal 24 warps to have a shape convex upward, as illustrated in FIG. 6(*a*). In this case, however, the hammer 27 provided on the spring member 26 moves upward and does not strike the vibration-driven energy harvesting unit 2, and the vibration-driven energy harvesting unit 2 does not generate electric power.

The modification 5 may be configured by setting a distance between the hammer 27 and the vibration-driven energy harvesting unit 2, an elastic constant of the spring member 26, and the like appropriately so that the hammer 27 strikes the vibration-driven energy harvesting unit 2 only once at a time of the inversion of the bimetal 24 occurring with a temperature rise. In a case where the hammer 27 strikes the vibration-driven energy harvesting unit 2 a plurality of times or a case where the hammer 27 stops being in contact with the vibration-driven energy harvesting unit 2, there is a possibility that the vibration of the vibration-driven energy harvesting element is hindered.

It should be noted that the modification 5 may be configured by disposing the bimetal 24 turned upside-down from the example described above so that the hammer 27 strikes the vibration-driven energy harvesting unit 2 to cause the vibration-driven energy harvesting unit 2 to generate electric power when the temperature drops.

In the modification 5, a temperature sensor that detects temperature may be used as the sensor 12 included in the detector 6 of the measurement systems 1, 1*a*, and 1*b* illustrated in FIG. 1 to FIG. 3.

Modification 6 of Measurement Systems in First Embodiment and Second Embodiment With reference to FIG. 7, a modification 6 of the measurement systems in the first embodiment and the second embodiment will be described. The modification 6 is mostly common to the configuration of the modification 5 described above. Therefore, description will be given below particularly of differences from the modification 5, and description of common components will be omitted as appropriate.

Figure 7:
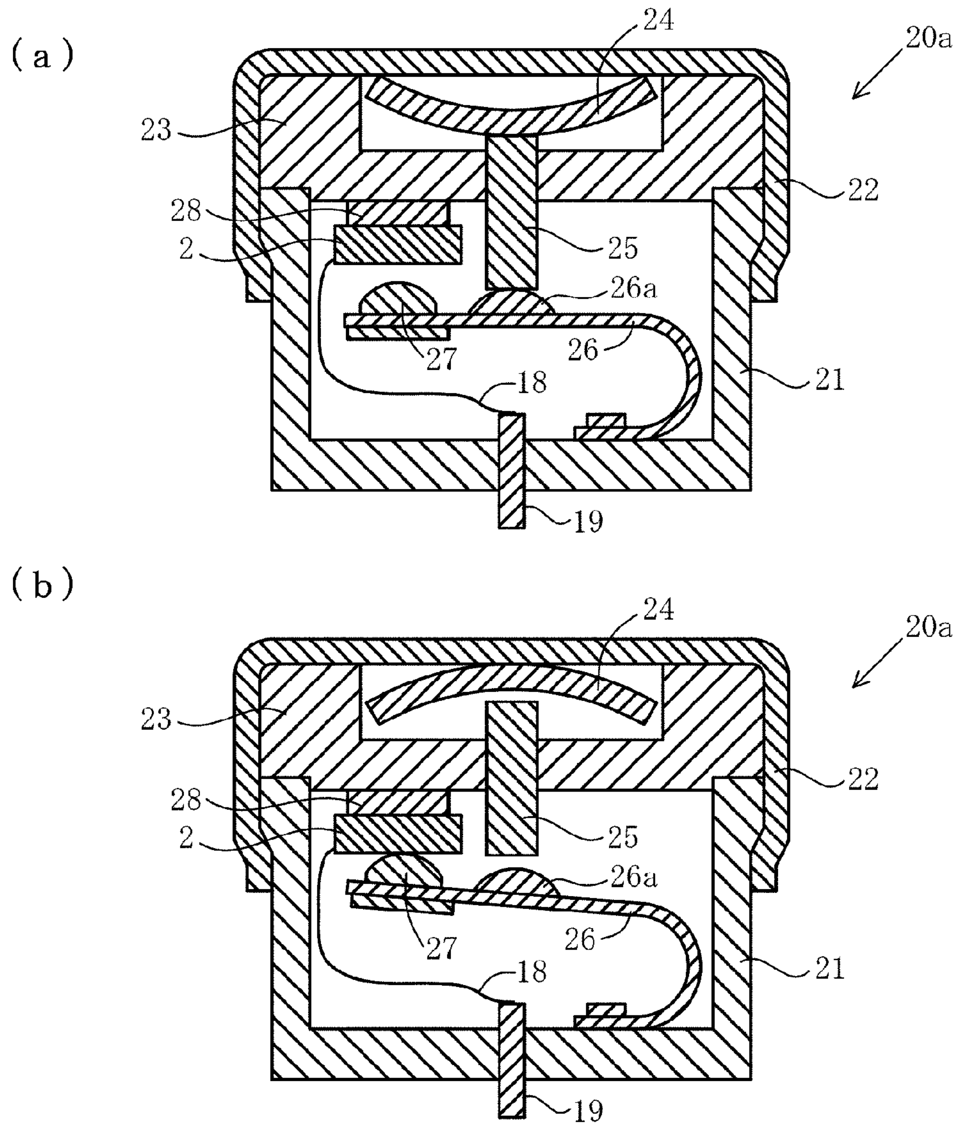
FIG. 7 is a diagram illustrating a schematic configuration of a modification 6 of the measurement system.

FIG. 7(*a*) illustrates a vibration generator 20*a* in the modification 6 in a state of a relatively low temperature. Unlike the vibration generator 20 in the modification 5, in the modification 6, the vibration-driven energy harvesting unit 2 is supported by the guide 23 via the elastic body 28. Further, the bimetal 24 warps to have a shape convex downward at a low temperature. In this state, the pressing part 26*a* of the spring member 26 is pushed from above via the operation pin 25 to below the bimetal 24.

FIG. 7(*b*) illustrates a moment when the bimetal 24 deforms due to a temperature rise, so as to invert the shape of the warp to a shape that is convex upward. At this time, a force pushing the pressing part 26*a* of the spring member 26 downward is released, and thus the hammer 27 provided on the spring member 26 rapidly moves upward by elastic force of the spring member 26, striking the vibration-driven energy harvesting unit 2. The vibration-driven energy harvesting unit 2 generates electric power from vibration or sound that then occurs, so that measurement systems 1, 1*a*, and 1*b* illustrated in FIG. 1 to FIG. 3 are brought from the standby state to the operating state.

Thereafter, the hammer 27 provided on the spring member 26 is separated from the vibration-driven energy harvesting unit 2 by restoring force of the spring member 26, stopping at a position away from the vibration-driven energy harvesting unit 2.

When an ambient temperature of the vibration generator 20 drops thereafter, the shape of the bimetal 24 returns to a state where the bimetal 24 warps to have a shape convex downward, as illustrated in FIG. 7(*a*). At this time, the bimetal 24 causes, via the operation pin 25, the hammer 27 provided on the spring member 26 to rapidly move downward. However, a direction in which the hammer 27 moves is a direction of separating from the vibration-driven energy harvesting unit 2, and the hammer 27 does not strike the vibration-driven energy harvesting unit 2; therefore, the vibration-driven energy harvesting unit 2 does not generate electric power.

In the modification 6, the hammer 27 strikes the vibration-driven energy harvesting unit 2 not by the impulsive force itself of the bimetal 24 rapidly deforming with a temperature change but by the elastic force of the spring member 26. The impulsive force striking the vibration-driven energy harvesting unit 2 thus can be maintained substantially constant in magnitude. It is therefore possible to allow the vibration-driven energy harvesting unit 2 to generate electric power stably.

It should be noted that the modification 6 also may be configured by disposing the bimetal 24 turned upside-down from the example described above so that the hammer 27 strikes the vibration-driven energy harvesting unit 2 to cause the vibration-driven energy harvesting unit 2 to generate electric power when the temperature drops.

Modification 7 of Measurement System in Each Embodiment

Figure 8:
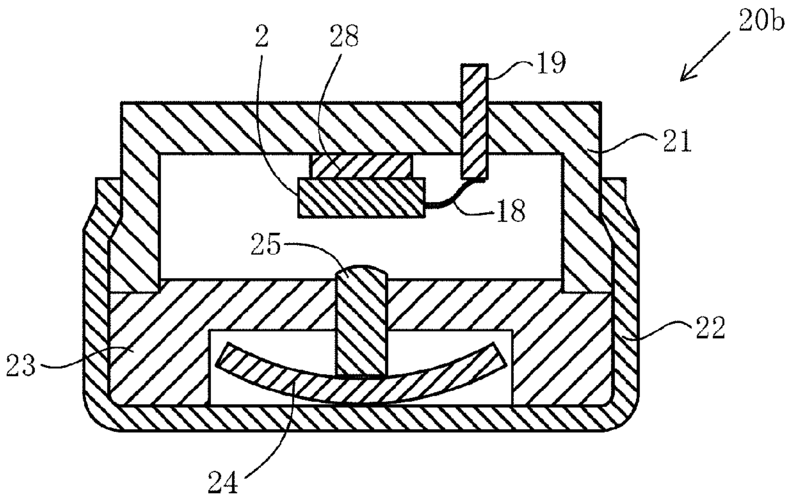
FIG. 8 is a diagram illustrating a schematic configuration of a modification 7 of the measurement system.

With reference to FIG. 8, a modification 7 of the measurement systems in the first embodiment and the second embodiment will be described. A configuration of the modification 7 is mostly common to the configurations of the modification 5 and the modification 6 described above. Therefore, description will be given below particularly of differences from the modification 5 and the modification 6, and description of common components will be omitted as appropriate.

FIG. 8 illustrates a vibration generator 20*b* in the modification 7 in a state of a relatively low temperature. In the modification 7, the bimetal 24 warps to have a shape convex downward at a low temperature.

When an ambient temperature of the vibration generator 20*b* rises to equal to higher than a predetermined temperature, the bimetal 24 rapidly deforms into a shape convex upward. As a result, the bimetal 24 causes the operation pin 25 to rapidly move upward, and the operation pin 25 strikes the vibration-driven energy harvesting unit 2. This produces vibration or sound, from which the vibration-driven energy harvesting unit 2 generates electric power.

The configuration in the modification 7 is simple because the spring member 26 can be omitted, and the configuration allows cutting down on costs compared with the configurations of the modification 5 and the modification 6.

On the other hand, the configurations of the modification 5 and the modification 6 have an effect of allowing an orientation of the vibration generators 20 and 20*a* to be set irrespective of a gravity direction.

In the modification 5 to the modification 7, a position where the vibration-driven energy harvesting unit 2 is placed is not limited to the inside of the vibration generators 20, 20*a*, and 20*b* and may be a vicinity of the vibration generators 20, 20*a*, and 20*b*.

Modification 8 of Measurement System in Each Embodiment

Figure 9:
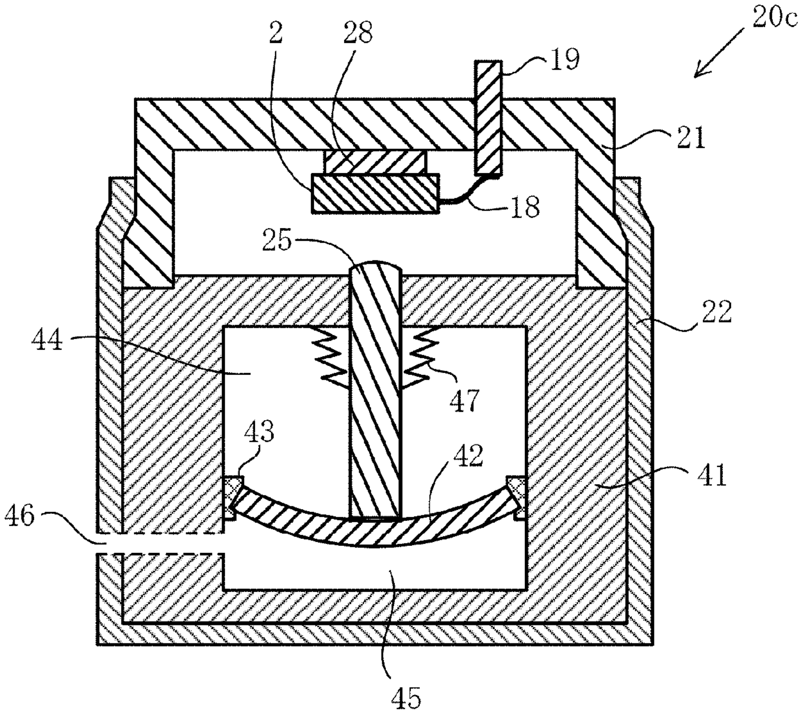
FIG. 9 is a diagram illustrating a schematic configuration of a modification 8 of the measurement system.

With reference to FIG. 9, a modification 8 of the measurement system in each of the first to third embodiments will be described. Many parts in a configuration of a measurement system of modification 8 are shared with the configuration of the measurement system of the modification 7 described above. Description will be given below particularly of differences from the modification 7, and description of common components will be omitted as appropriate.

As illustrated in FIG. 9, in the modification 8, the vibration-driven energy harvesting unit 2 is provided inside a vibration generator 20*c* that generates sound or vibration in accordance with pressure, which is an example of an environment state quantity.

The vibration generator 20*c* includes, as with the vibration generator 20*b* in the modification 7, a housing including the case 21, the cap 22, a guide 41, and the like and includes, inside the housing, the vibration-driven energy harvesting unit 2, and a pressure bulkhead 42.

The pressure bulkhead 42 is provided as a diaphragm between an airtight space 44 formed by the guide 41 and an opened space 45, and the airtight space 44 is made airtight from the opened space 45 by the pressure bulkhead 42 and a supporting part 43. In contrast, the opened space 45 communicates with the outside via an air hole 46, and a pressure inside the opened space 45 is the same as a pressure of the outside (air pressure).

The pressure bulkhead 42 is, as an example, a metal plate having a shape that is concave toward the airtight space 44, and the pressure bulkhead 42 is pushed by both an air pressure of gas included in the airtight space 44 and an air pressure of gas included in the opened space 45. On the pressure bulkhead 42, the operation pin 25 is disposed through a through hole provided in the guide 41 such that an upper end of the operation pin 25 faces the vibration-driven energy harvesting unit 2. To maintain airtightness between the operation pin 25 and the guide 41, a vacuum bellows 47 may be provided between the operation pin 25 and the guide 41.

When the atmospheric pressure exceeds a predetermined value, the air pressure in the opened space 45 rises, and the pressure bulkhead 42 rapidly deforms into a shape convex toward the airtight space 44.

The deformation pushes the operation pin 25 upward to cause the operation pin 25 to collide with the vibration-driven energy harvesting unit 2, and the vibration-driven energy harvesting unit 2 vibrates.

In contrast, when the atmospheric pressure falls below the predetermined value, the air pressure in the opened space 45 drops, and the pressure bulkhead 42 deforms into its original shape, which is concave toward the airtight space 44.

It should be noted that the configuration of the measurement system in the modification 8 is not limited to a configuration for generating sound in response to a change in the atmospheric pressure described above and can be a configuration for generating sound in accordance with air pressure or fluid pressure (hydraulic pressure) in a measurement object. To set up such a configuration, for example, gas or liquid in the measurement object is to be led into the opened space 45 via the air hole 46.

Modification 9 of Measurement System in Each Embodiment

Figure 10:
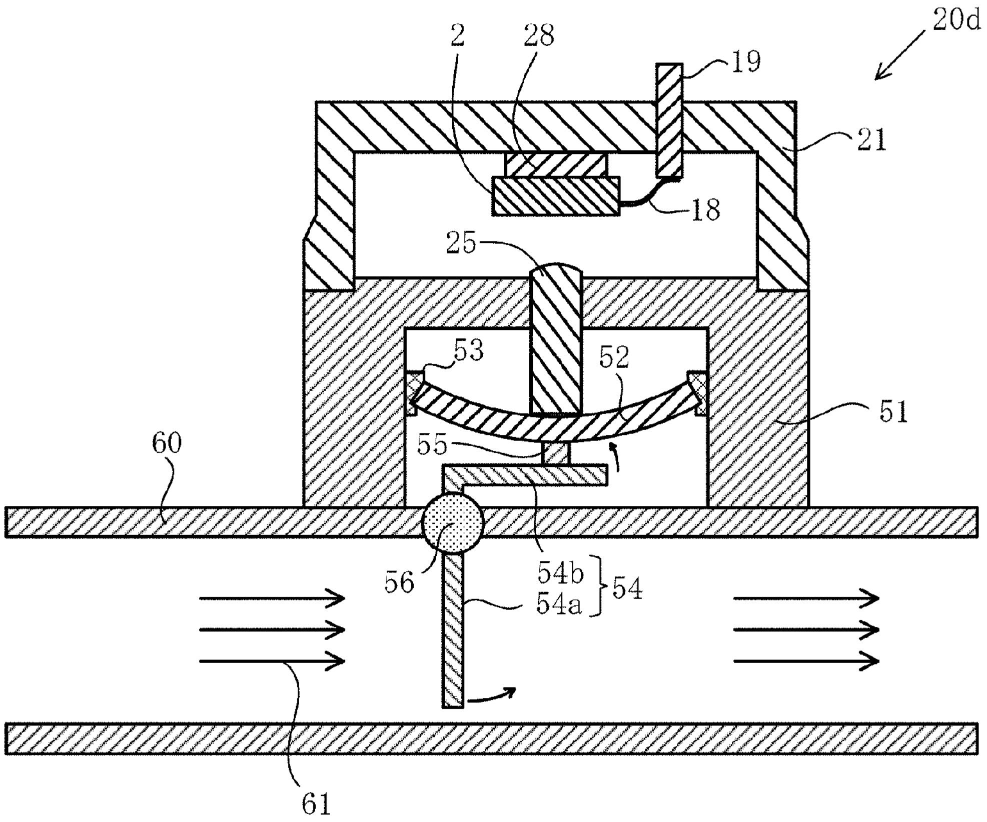
FIG. 10 is a diagram illustrating a schematic configuration of a modification 9 of the measurement system.

With reference to FIG. 10, a modification 9 of the measurement system in each of the first to third embodiments will be described. Many parts in a configuration of a measurement system of modification 8 are shared with the configuration of the measurement system of the modification 7 described above. Description will be given below particularly of differences from the modification 7, and description of common components will be omitted as appropriate.

As illustrated in FIG. 10, in the modification 9, the vibration-driven energy harvesting unit 2 is provided inside a vibration generator **20*d*** that generates sound or vibration in accordance with flow rate, which is an example of an environment state quantity.

The vibration generator **20*d* includes, as with the vibration generator 20*b* in the modification 7, a housing including the case 21, a guide 51, and the like and includes, inside the housing, the vibration-driven energy harvesting unit 2, and a curved plate 52. An edge portion of the curved plate 52 is fixed to an inner wall of the guide 51 with a supporting part 53. The curved plate 52 is, as an example, a metal plate having a shape that is concave toward the operation pin 25**.

A lower end portion of the guide 51 is fixed to a side face of a pipe 60. In the pipe 60, a paddle 54 having a substantially L shape is inserted pivotably with a pivot 56 serving as a rotation axis. The paddle 54 includes a first part **54*a* that is inside the pipe 60 and includes a second part 54*b* that is outside the pipe 60, and a pressing part 55 provided on the second part 54*b* is disposed facing the curved plate 52**.

As illustrated in FIG. 10, when fluid 61 flows inside the pipe 60 in a direction indicated by arrows, the first part **54*a* of the paddle 54 receives a force that causes the paddle 54 to rotate counterclockwise around the pivot 56 serving as the rotation axis. This force travels to the second part 54*b* of the paddle 54, causing the pressing part 55 provided on the second part 54*b* to push the curved plate 52** upward.

When a flow rate of the fluid 61 flowing inside the pipe 60 becomes equal to or greater than a predetermined value, a force of the pressing part 55 pushing the curved plate 52 upward increases, so that a shape of the curved plate 52 rapidly deforms into a shape convex toward the operation pin 25.

The deformation pushes the operation pin 25 upward to cause the operation pin 25 to collide with the vibration-driven energy harvesting unit 2, and the vibration-driven energy harvesting unit 2 vibrates.

In contrast, when the flow rate of the fluid 61 flowing inside the pipe 60 becomes less than the predetermined value, the force of the pressing part 55 pushing the curved plate 52 upward decreases, so that the curved plate 52 is brought back to its original shape, which is concave toward the operation pin 25, by a weight of the operation pin 25 and the like.

In the modification 4 to the modification 8 described above, the vibration-driven energy harvesting unit 2 is supposed to generate electric power from vibration produced by the operation pin 25 being moved by the rapid change in the shape of each of the bimetal 24, the pressure bulkhead 42, and the curved plate 52 to collide with the vibration-driven energy harvesting unit 2. However, the operation pin 25 need not be provided, and the vibration-driven energy harvesting unit 2 may be configured to generate electric power from sound produced when the bimetal 24, the pressure bulkhead 42, and the curved plate 52 rapidly deform.

(Advantageous Effects of Measurement Systems in Embodiments and Modifications)

(1) The measurement systems 1, **1*a*, and 1*b* in the above-described embodiments and modifications each include the vibration-driven energy harvesting unit 2 or 2*a* that generates electric power from sound, vibration, or displacement, the power supply controller 4 or 40 that controls an amount of power consumption of the power supply 10 based on the electric power generated by the vibration-driven energy harvesting unit 2 or 2*a* (the output voltage V0), the detector 6 that is driven by electric power supplied from the power supply controller 4 or 40 and detects an environment state quantity, and the transmitter 7 that is driven by electric power supplied from the power supply controller 4 or 40 and transmits information regarding the environment state quantity detected by the detector 6**.

In this configuration, the vibration-driven energy harvesting units 2 and **2*a* that function as an event sensor for switching the measurement systems 1, 1*a*, and 1*b* from the standby state to the operating state do not consume the electric power from the power supply 10 in the standby state. Therefore, power consumption of the measurement systems 1, 1*a*, and 1*b* in the standby state can be reduced considerably. This enables an increase in lifetime of the power supply 10 of the measurement systems 1, 1*a*, and 1*b* and enables a reduction of the number of times of maintenance for replacement of the power supply 10. As a result, it is possible to provide the measurement systems 1, 1***a*, and 1*b* of which maintenance costs are reduced.

(2) The measurement systems 1 and 1*a* can have a configuration further including the signal processor 5*a* that is driven by the electric power supplied by the power supply controllers 4 and 40, extracts predetermined information (the second signal S2) included in the environment state quantity (the first signal S1) detected by the detector 6, and conveys the information to the transmitter 7. In this configuration, the transmitter 7 is only required to transmit the second signal S2, which is extracted from the first signal S1 and has a data amount smaller than that of the environment state quantity, and thus a data amount of the information to be transmitted to the outside is reduced, so that electric power required for the transmission can be reduced.

(3) The power supply controller 4 of the measurement system 1*a* may have a configuration further including the first power supply controller 4*a* that controls the amount of power consumption of the signal processor 5*a* based on the electric power generated by the vibration-driven energy harvesting unit 2 or 2*a* (the output voltage V0), the control signal generator 5*b* that generates the third control signal V3 and the fourth control signal V4 based on the voltage of the electric power supplied from the first power supply controller 4*a* to the signal processor 5*a*, the second power supply controller 8 that controls the amount of power consumption of the detector 6 based on the third control signal V3, and the third power supply controller 9 that controls the amount of power consumption of the transmitter 7 based on the fourth control signal V4.

In this configuration, the control signal generator 5*b* and the like can control the timing for supplying and reducing, or interrupting the electric power from the power supply 10 to the detector 6 and the transmitter 7 more sophisticatedly. It is thus possible to further reduce the power consumption of the measurement system 1*a*.

(4) Further, by configuring the power supply controllers 4 and 40 such that the power supply controllers 4 and 40 supply a predetermined amount of electric power when the first control signal V1 based on the electric power generated by the vibration-driven energy harvesting units 2 and 2*a* exceeds the first voltage and supply electric power smaller than the predetermined amount or does not supply the electric power when the first control signal S1 is equal to or lower than the first voltage, it is possible to further reduce the power consumption of the measurement systems 1, 1*a*, and 1*b* in the standby state.

(5) Further, the power supply controllers 4 and 40 may be configured to control the amounts of power consumption of the detector 6, the transmitter 7, and the signal processor 5*a* individually based on the first control signal V1, so that, in the standby state, one of the detector 6, the transmitter 7, or the signal processor 5*a* can be put on standby in what is called a sleep mode, which is power saving.

(6) The holding circuit 3 that outputs the first control signal V1 based on the electric power generated by the vibration-driven energy harvesting units 2 and 2*a* can be further included, and the power supply controllers 4 and 40 can be configured to control the amount of power consumption of the power supply 10 based on the first control signal V1, and the holding circuit 3 can be configured to continue outputting the first control signal V1 having a voltage equal to or lower than the first voltage unless the output voltage V0 of the vibration-driven energy harvesting units 2 and 2*a* exceeds the second voltage and continue outputting the first control signal V1 having a voltage higher than the first voltage when the output voltage V0 of the vibration-driven energy harvesting units 2 and 2*a* exceeds the second voltage. In this configuration, when vibration or sound in an environment causes the output voltage V0 of the vibration-driven energy harvesting units 2 and 2*a* to increase to exceed the second voltage, the supply of the electric power to the detector 6 and the transmitter 7 can be continued even when the output voltage V0 thereafter becomes equal to or lower than the second voltage. The detector 6 therefore can detect the environment state quantity stably, and the transmitter 7 can transmit the information based on the environment state quantity to the outside stably.

(7) Further, the holding circuit 3 can be configured to be set to a state of outputting the first control signal V1 of which a voltage is equal to or lower than the first voltage by inputting the second control signal V2 that reports completion of the transmission of the information by the transmitter 7 into the holding circuit 3. This configuration enables the measurement systems 1, 1*a*, and 1*b* to interrupt the supply of the electric power to the detector 6 and the transmitter 7 immediately after the transmitter 7 completes the transmission of the information, so as to further reduce the power consumption.

(8) Further, the transmitter 7 of the measurement systems 1, 1*a*, and 1*b* can be configured as a wireless transmitter that performs the transmission wirelessly. With this configuration, it is possible to provide the measurement systems 1, 1*a*, and 1*b* that are operable at a low cost even when the measurement systems 1, 1*a*, and 1*b* are operated at a remote location that makes wired transmission difficult or involves a high cost for equipping wired transmission environment.

(9) Further, the vibration-driven energy harvesting unit 2 of the measurement systems 1, 1*a*, and 1*b* can be configured to have an electric power generation efficiency that is higher for sounds or vibrations of a predetermined frequency band than for sounds or vibrations with other frequencies. This configuration can enhance a detection sensitivity of the vibration-driven energy harvesting unit 2 as an event sensor for the measurement systems 1, 1*a*, and 1*b* that is supposed to measure sounds or vibrations with a predetermined frequency.

(10) Further, the detector 6 of the measurement systems 1, 1*a*, and 1*b* can be configured as a sound detector that detects sound as an environment state quantity, and the vibration-driven energy harvesting unit 2 can be configured to vibrate by the sound detected as the environment state quantity to generate electric power. This configuration can enhance a detection sensitivity of the vibration-driven energy harvesting unit 2 as an event sensor for sound to be detected by the measurement systems 1, 1*a*, and 1*b*.

(Diagnostic System in One Embodiment)

Figure 11:
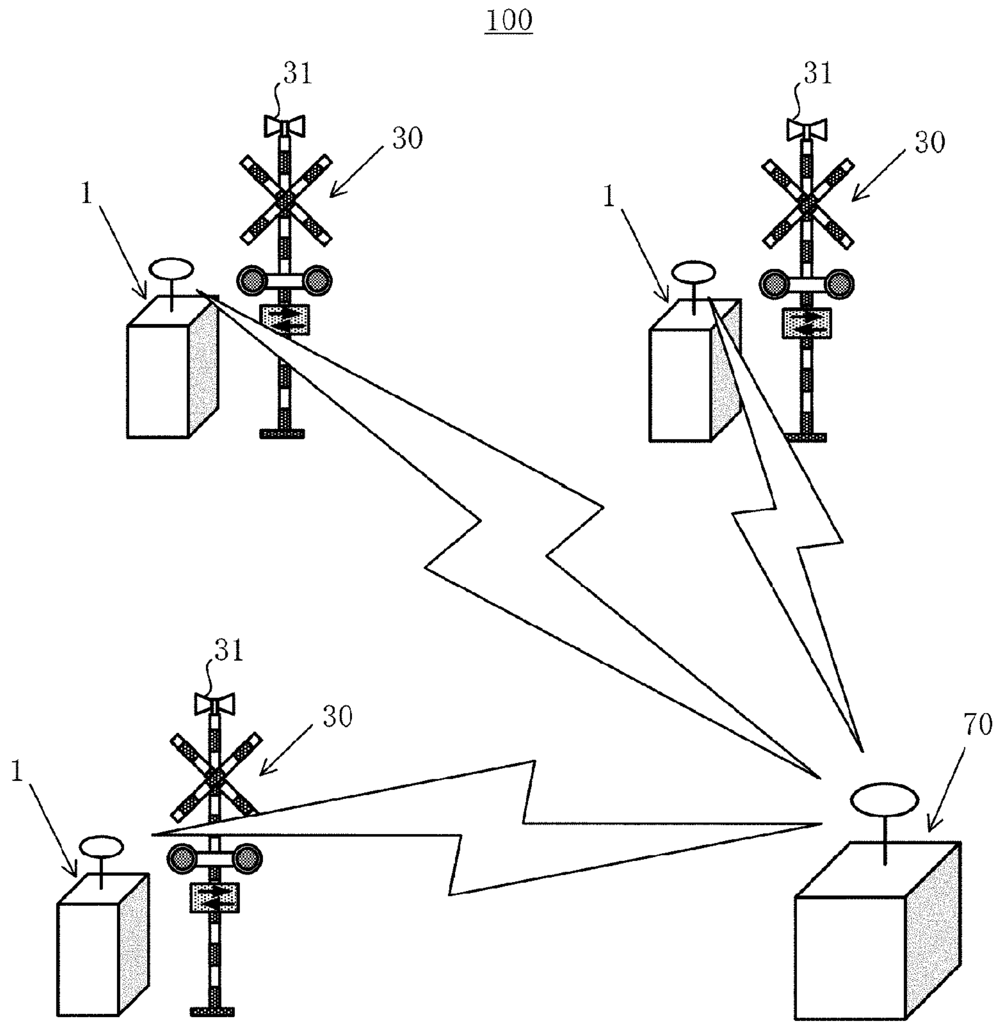
FIG. 11 is a diagram illustrating a schematic configuration of one embodiment of a diagnostic system.

FIG. 11 is a diagram illustrating a diagnostic system 100 in one embodiment. The diagnostic system 100 is, as an example, a system that diagnoses operation statuses of railroad crossing signals 30 as diagnosis objects. Many railroad crossings are placed at remote locations. Further, in many railroad crossings, there is a problem in that a diagnostic system is difficult to be supplied with a relatively low voltage, stable electric power from a railroad crossing or an electric power line supplied to the railroad crossing. Accordingly, as a system that diagnoses an operation status of a railroad crossing, there is a demand for a system that includes a power supply such as a battery and is capable of continuing the diagnosis for an extended period of time with a limited electric power from the power supply.

In the diagnostic system 100, one of the measurement systems 1, 1*a*, and 1*b* according to any one of the embodiments or the modification 1 to modification 3 described above or any one of the modification 5 to modification 7 described above is placed such that the measurement system is adjacent to each of a plurality of railroad crossing signals 30 or in a vicinity of the railroad crossing signal 30. FIG. 11 illustrates the measurement systems 1, 1*a*, and 1*b* collectively as measurement systems 1. Signals wirelessly transmitted by the measurement systems 1 are received by a receiving system 70. As an example, the plurality of railroad crossing signals 30 are at remote locations that are all several kilometers or longer away from the receiving system 70. Based on the received signals, the receiving system 70 diagnoses, as the operation statuses of the railroad crossing signals 30 as diagnosis objects, whether a volume of warning sound emitted by warning sound emitters 31 is a predetermined volume or whether the number of occurrences of the warning sound is a proper number.

Figure 12:
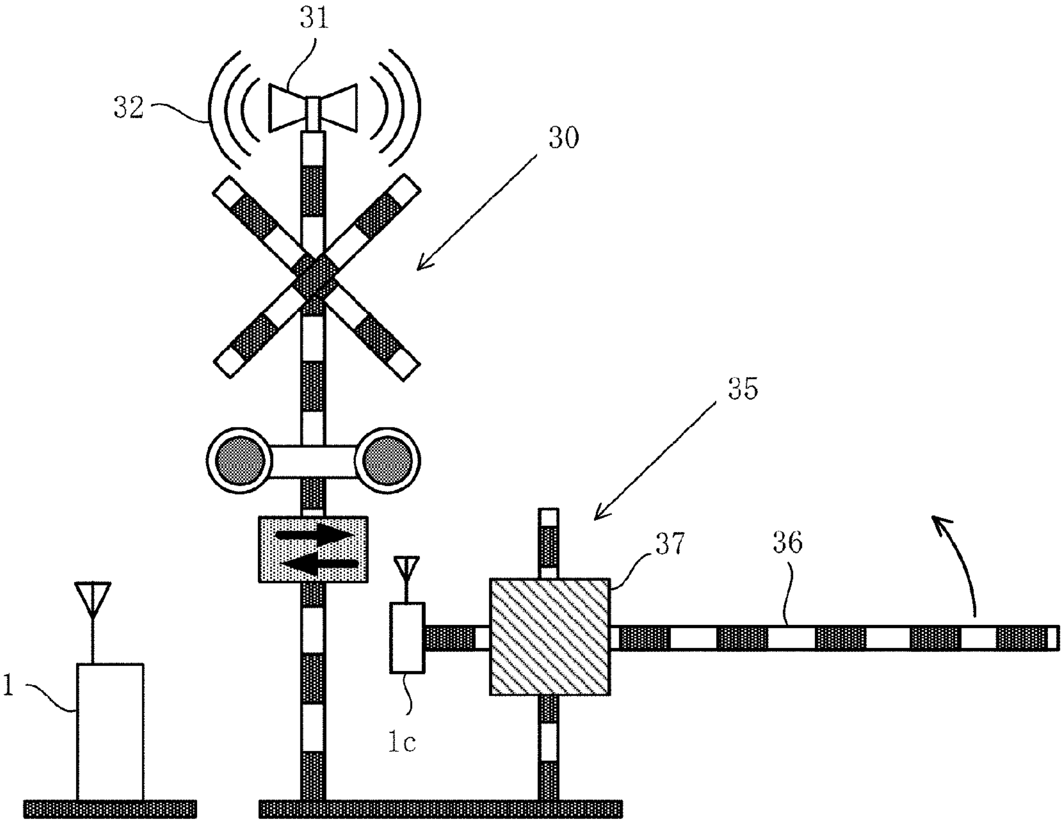
FIG. 12 is a diagram illustrating a usage example of the measurement system in the diagnostic system.

FIG. 12 is a diagram illustrating a usage example of a measurement system 1 in the diagnostic system 100. The measurement system 1 is placed adjacent to a railroad crossing signal 30 or in a vicinity of the railroad crossing signal 30. When a train is approaching in a proximity to the railroad crossing, the railroad crossing signal 30 causes the warning sound emitters 31 to emit warning sound 32 around the warning sound emitters 31. In a state where the warning sound 32 is not emitted, the measurement system 1 maintains the standby state to reduce its power consumption, and when the emission of the warning sound 32 starts, the measurement system 1 is brought into the operating state to measure the warning sound 32.

When the emission of the warning sound 32 starts, energy of sound of the warning sound 32 causes a vibration-driven energy harvesting unit 2 in the measurement system 1 to start generating electric power. For reference characters of components constituting the measurement system 1, see FIG. 1 and FIG. 2. A first control signal V1 based on the electric power generated by the vibration-driven energy harvesting unit 2 causes the power supply controller 4 to start supply of electric power from a power supply 10 to a detector 6, a signal processor 5*a*, and a transmitter 7, bringing the measurement system 1 into the operating state.

The detector 6 then detects the warning sound 32, the signal processor 5*a* performs the signal processing on a first signal S1 based on the sound detected by the detector 6 to calculate a second signal S2, and the transmitter 7 modulates the second signal S2 and transmits the modulated second signal S2 to the receiving system 70.

When the emission of the warning sound 32 stops after the train passes, or after a lapse of a predetermined time period from the start of the supply of the electric power by the power supply controller 4, the power supply controller 4 interrupts the supply of the electric power from the power supply 10 to the detector 6, the signal processor 5*a*, and the transmitter 7, bringing the measurement system 1 into the standby state. In the standby state, the power consumption of the measurement system 1 is kept extremely low, as described above.

Diagnosis objects for the diagnostic system 100 in one embodiment are the railroad crossing signals 30. Therefore, for the vibration-driven energy harvesting unit 2 included in the measurement system 1, its electric power generation efficiency for sounds or vibrations of a frequency band including a frequency of the warning sound emitted by the warning sound emitters 31, for example, 700 Hz or 750 Hz, may be enhanced so as to be higher than electric power generation efficiencies for sounds or vibrations with other frequencies.

(Diagnostic System in Modification)

In FIG. 12, a measurement system 1*c* placed on a crossing bar 36 of a crossing gate 35 of a railroad crossing is a measurement system in the modification 4 described above; the measurement system 1*c* measures an attitude of the measurement system 1*c*, as an environment state quantity and transmits information regarding the attitude.

When a train is approaching in a proximity to the railroad crossing, and warning sound 32 is emitted by a warning sound emitters 31, energy of sound of the warning sound 32 causes a vibration-driven energy harvesting unit 2 in the measurement system 1*c* to start generating electric power, bringing the measurement system 1*c* from the standby state into the operating state.

When the train approaches more, the crossing bar 36 rotates about a rotation mechanism 37, and the crossing bar 36 is lowered, changing the attitude of the measurement system 1*c*. FIG. 12 illustrates a state where the crossing bar 36 is lowered to close the railroad crossing.

The measurement system 1*c* measures the attitude before and after the rotation of the crossing bar 36 and transmits information regarding the attitude of the measurement system 1*c* to the receiving system 70.

When receiving the information from the measurement system 1*c*, the receiving system 70 diagnoses whether the crossing bar 36 of the crossing gate 35 has rotated by a proper angle based on the information regarding the attitude of the measurement system 1*c* transmitted from the measurement system 1*c*.

In the embodiment and modification described above, the diagnosis objects for the diagnostic system 100 are assumed to be the railroad crossing signals 30 or the crossing gate 35, but the diagnosis objects are not limited to these. The diagnostic system 100 may diagnose any objects as long as sound or vibration emitted from the diagnosis objects can be used as a trigger for starting the diagnosis.

For example, various types of social infrastructure equipment, such as a siren for disaster prevention, a speaker for disaster prevention, an alarm regarding emergency water discharge from a dam, can be diagnosis objects.

Further, the start of diagnosis by the measurement system 1 of the diagnostic system 100 may be triggered by sound (impact sound) or vibration that occurs when a movable part such as an electromagnetic valve provided on a diagnosis object operates.

Further, the diagnostic system 100 may include, as a measurement system 1, a measurement system according to any one of the modification 5 to the modification 7 described above, and start of diagnosis by the measurement system may be triggered by a change in temperature or air pressure in an environment where the measurement system is placed.

In addition to the information regarding the environment state quantity detected by the detector 6, information for identifying a plurality of measurement systems 1 and 1*a* to 1*c* transmitting information to the receiving system 70 from one another may be added to the information transmitted from the measurement systems 1 and 1*a* to 1*c* to the receiving system 70.

Further, as described above, the measurement systems 1 and 1*a* to 1*c* may transmit information such as an operation history to the receiving system 70 at predetermined intervals.

The number of measurement systems 1 and 1*a* to 1*c* transmitting the information to the receiving system 70 may be one.

It should be noted that, in the diagnostic system 100, the transmission from the measurement systems 1 and 1*a* to 1*c* to the receiving system 70 may be performed via a line such as a telephone line or the Internet link. That is, signals transmitted from the measurement systems 1 and 1*a* to 1*c* may be first received by a relay station and then transmitted from the relay station to the receiving system 70 via a line.

By configuring the measurement systems 1 and 1*a* to 1*c* to also transmit information regarding their operating statuses and their remaining amounts of electric energy in power supplies 10 described above to the receiving system 70, the receiving system 70 can also diagnose statuses of the measurement systems 1 and 1*a* to 1*c* such as the remaining amounts of the power supplies 10. This configuration enables diagnosis about an appropriate time for replacement of batteries of the measurement systems 1 and 1*a* to 1*c*.

(Advantageous Effects of Diagnostic Systems in One Embodiment and Modification)

(11) The diagnostic system 100 in one embodiment and the modification includes the measurement systems 1 and 1*a* to 1*c* according to the embodiments and modifications that are placed in vicinities of diagnosis objects (railroad crossing signals 30, crossing gate 35) and the receiving system 70 that receives signals transmitted from the measurement systems 1 and 1*a* to 1*c* and diagnoses statuses of the diagnosis objects based on the received signals.

With this configuration, it is possible to provide the diagnostic system 100 that keeps the power consumption of the measurement systems 1 and 1*a* to 1*c* during standby low, keeps the electric power consumed by the power supplies 10 of the measurement systems 1 and 1*a* to 1*c* low, and stably operates for an extended period of time.

(Detection Switch)

Embodiments and modifications of a detection switch will be described below.

As will be described later, the embodiments and the modifications of the detection switch are included in the measurement systems in the embodiments and the modifications that have already been described above.

Thus, before the embodiments and the modifications of the detection switch are described, an overview of the detection switch, which is common to the embodiments and the modifications, will be described with reference to FIG. 13.

Figure 13:
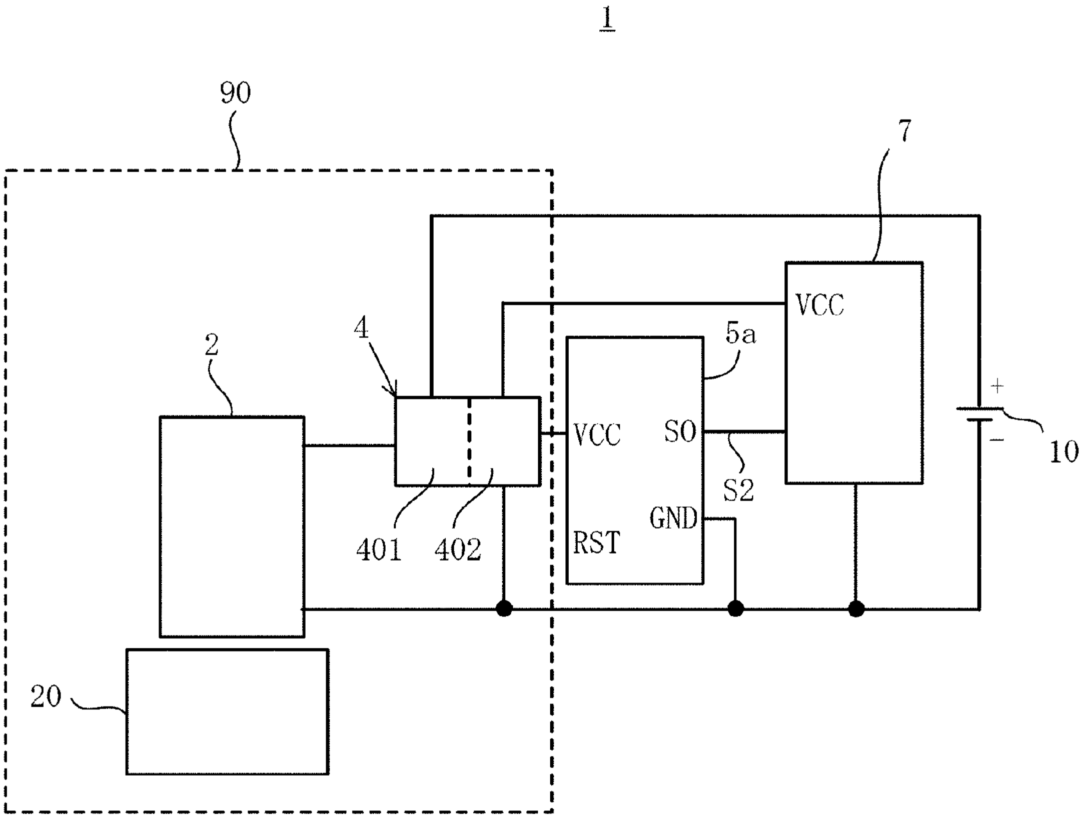
FIG. 13 is a diagram illustrating an outline of a measurement system including a detection switch in embodiments and modifications.

FIG. 13 illustrates anew a configuration of a measurement system 1 including a detection switch 90 in one of the embodiments and the modifications. It should be noted that, as described above, detection switches 90 in the embodiments and the modifications have already been illustrated in FIG. 1, FIG. 2, and FIG. 6 to FIG. 10, and FIG. 13 illustrates an outline of the detection switches 90.

The detection switch 90 includes a vibration detector (vibration-driven energy harvesting unit 2) that generates electric signal in accordance with sound, vibration, or displacement and a detecting unit 401 that is a part of a power supply controller 4 and detects whether an output, such as a voltage, of an electric signal generated by the vibration detector (2) is greater than a predetermined value or equal to or less than the predetermined value. The detection switch 90 further includes a vibration generator 20. The detection switch 90 may include a holding circuit 3 (see FIG. 1 to FIG. 3).

The detection switch 90 further includes an output controller 402 that is the power supply controller 4 other than the detecting unit 401, and the output controller 402 controls an amount of electric power supplied from a power supply 10 based on a result of the detection by the detecting unit 401.

It should be noted that, as illustrated in FIG. 3, the power supply controller 4, namely the detecting unit 401 and the output controller 402, may be included in a controller 5. Similarly, the power supply controller 4, namely the detecting unit 401 and the output controller 402, may be included in a signal processor 5*a*.

The detection switch 90 need not necessarily include a vibration generator 20.

Further, the detection switch 90 need not necessarily include the output controller 402 and may output a result of the detection by the detecting unit 401 to the outside. In this case, external devices not included in the detection switch 90 (e.g., the signal processor 5*a* and a transmitter 7) are to control an amount of the electric power supplied from the power supply 10 based on the result of the detection by the detecting unit 401.

(Detection Switch in First Embodiment)

An embodiment of the detection switch is included in the measurement system 1 in the first embodiment that has already been described above, and thus the following description will be given of the embodiment of the detection switch with reference to the measurement system 1 in the first embodiment.

In the measurement system 1 in the above-described first embodiment illustrated in FIG. 1, the vibration-driven energy harvesting unit 2, the holding circuit 3, and the power supply controller 4 constitute the detection switch (2, 3, 4) in the first embodiment.

As described above, in a case where sound, vibration, or the like present in an environment is so weak that the vibration-driven energy harvesting unit 2 does not generate electric power equal to or higher than a predetermined value, a control terminal CNT of the power supply controller 4 receives a first control signal V1 of which a voltage is equal to or lower than a first voltage being a threshold voltage. At this time, the power supply controller 4 interrupts supply of electric power to its output terminal OUT.

In contrast, in a case where sound, vibration, or the like present in an environment becomes strong enough for the vibration-driven energy harvesting unit 2 to generate the electric power equal to or higher than the predetermined value, the control terminal CNT of the power supply controller 4 receives the first control signal V1 of which the voltage exceeds the first voltage being the threshold voltage. At this time, the power supply controller 4 outputs, to the output terminal OUT, the electric power input from the power supply 10 to its power supply terminal IN.

Accordingly, the vibration-driven energy harvesting unit 2, the holding circuit 3, and the power supply controller 4 constitute the detection switch (2, 3, 401) that includes the vibration-driven energy harvesting unit 2 serving as a vibration detector generating electric power from sound or vibration, and the detecting unit 401 in the power supply controller 4 that detects whether the output of the electric signal generated by the vibration-driven energy harvesting unit 2 is greater than the predetermined value or equal to or less than the predetermined value (see FIG. 13). Further, the power supply controller 4 includes the output controller 402 that controls, based on the result of detection by the detecting unit 401, the amount of electric power supplied by the power supply (see FIG. 13).

(Detection Switch in Second Embodiment)

In the measurement system 1*a* in the above-described second embodiment illustrated in FIG. 2, the vibration-driven energy harvesting unit 2, the holding circuit 3, and the detecting unit 401 that is included in the first power supply controller 4*a* (see FIG. 13) also constitute the detection switch (2, 3, 4*a*) in the second embodiment, as with the measurement system 1 in the above-described first embodiment illustrated in FIG. 1. The reason for this is the same as that for the detection switch (2, 3, 4) in the above-described first embodiment, and therefore description thereof will be omitted.

It should be noted that, as described in the modification of the vibration-driven energy harvesting unit with reference to FIG. 4, in a case where an energy harvesting unit including a displacement-driven energy harvesting element, which produces an electromotive force from a displacement (deformation) of a piezoelectric element or the like, is used as the vibration-driven energy harvesting unit 2, the detection switch (2, 3, 4, 4*a*) in the first embodiment or the second embodiment includes the vibration-driven energy harvesting unit 2 that generates electric power from displacement.

(Various Modifications of Detection Switch)

Various modifications of the detection switch are included in any one of the modification 5 to the modification 9 of the measurement systems in the above-described first embodiment and second embodiment, and thus the following description will be given of the modifications of the detection switch with reference to the modification 5 to the modification 9.

Modification 1 of Detection Switch

A detection switch in a modification 1 is included in the above-described modification 5 of the measurement system, which is described with reference to FIG. 1, FIG. 2, and FIG. 6. That is, the detection switch in the modification 1 is different from the detection switch (2, 3, 4, 4*a*) in the above-described first embodiment and second embodiment in that the vibration generator 20 that changes in shape with a change in temperature as an environment state quantity to generate sound or vibration is provided in a vicinity of the vibration-driven energy harvesting unit 2. However, the other respects are the same as those in the detection switch (2, 3, 4, 4*a*) in the above-described first embodiment and second embodiment.

Since the configurations of the vibration-driven energy harvesting unit 2 and the vibration generator 20 have already been described, the description will be omitted.

As described above, when temperature as an environment state quantity rises or drops (changes) to substantially reach a predetermined temperature, the bimetal 24 included in the vibration generator 20 deforms (inverts) from the state illustrated in FIG. 6(*a*) to the state illustrated in FIG. 6(*b*). The impulsive force with the inversion of the bimetal 24 travels to the vibration-driven energy harvesting unit 2 as described above, and the vibration-driven energy harvesting unit 2 generates electric power from vibration or sound that occurs then. Then, as described above, the detecting unit 401 (see FIG. 13) in the power supply controller 4 or the first power supply controller 4*a* of the measurement system 1 or 1*a* illustrated in FIG. 1 or FIG. 2 detects whether the output of the electric signal, which is the electric power generated by the vibration-driven energy harvesting unit 2 is greater than the predetermined value or equal to or less than the predetermined value. When the result of the detection is that the output of the electric signal is greater than the predetermined value, the output controller 402 (see FIG. 13) included in the power supply controller 4 or the first power supply controller 4*a* starts the supply of the electric power from the output terminal OUT based on this result of the detection.

In contrast, before the temperature substantially reaches the predetermined temperature, the electric power generated by the vibration-driven energy harvesting unit 2 is weak, and thus the power supply controller 4 or the first power supply controller 4*a* interrupts the supply of the electric power from the output terminal OUT.

Therefore, the detection switch (2, 3, 4, 4*a*, 20) in the modification 1 includes the vibration generator 20 that changes in shape with a change in temperature as an environment state quantity to generate sound or vibration. In addition, in the power supply controller 4, the detecting unit 401 (see FIG. 13) that detects whether the output of the electric signal based on the electric power generated by the vibration-driven energy harvesting unit 2 from sound or vibration generated by the vibration generator 20 is greater than the predetermined value or equal to or less than the predetermined value is included. Further, the output controller 402 (see FIG. 13) in the power supply controller 4 or 4*a* controls the amount of the electric power supplied by the power supply 10 based on the result of the detection by the detecting unit 401.

It is thus possible to provide a detection switch that can detect a change in temperature as an environment state quantity, which is neither sound nor vibration, by being triggered by the change and that consumes a small amount of electric power from the power supply 10.

Modification 2 of Detection Switch

A detection switch in a modification 2 is included in the above-described modification 6 of the measurement system, which is described with reference to FIG. 1, FIG. 2, and FIG. 7. That is, the detection switch in the modification 2 is the same as the detection switch of the above-described modification 1 except that the vibration generator 20 illustrated in FIG. 6 is replaced with the vibration generator 20*a* illustrated in FIG. 7. Since the vibration generator 20*a* has already been described, the description will be omitted.

The detection switch (2, 3, 4, 4*a*, 20*a*) in the modification 2 includes the vibration generator 20*a* that changes in shape with a change in temperature as an environment state quantity to generate sound or vibration. In addition, in the power supply controller 4, the detecting unit 401 (see FIG. 13) that detects whether the output of the electric signal based on the electric power generated by the vibration-driven energy harvesting unit 2 from sound or vibration generated by the vibration generator 20*a* is greater than the predetermined value or equal to or less than the predetermined value is included. Further, the output controller 402 (see FIG. 13) in the power supply controller 4 or 4*a* controls the amount of the electric power supplied by the power supply 10 based on the result of the detection by the detecting unit 401.

Modification 3 of Detection Switch

A detection switch in a modification 3 is included in the above-described modification 7 of the measurement system, which is described with reference to FIG. 1, FIG. 2, and FIG. 8. That is, the detection switch in the modification 3 is the same as the detection switch of the above-described modification 1 except that the vibration generator 20 illustrated in FIG. 6 is replaced with the vibration generator 20*b* illustrated in FIG. 8. Since the vibration generator 20*b* has already been described, the description will be omitted.

The detection switch (2, 3, 4, 4*a*, 20*b*) in the modification 3 includes the vibration generator 20*b* that changes in shape with a change in temperature as an environment state quantity to generate sound or vibration. In addition, in the power supply controller 4, the detecting unit 401 (see FIG. 13) that detects whether the output of the electric signal based on the electric power generated by the vibration-driven energy harvesting unit 2 from sound or vibration generated by the vibration generator 20*b* is greater than the predetermined value or equal to or less than the predetermined value is included. Further, the output controller 402 (see FIG. 13) in the power supply controller 4 or 4*a* controls the amount of the electric power supplied by the power supply 10 based on the result of the detection by the detecting unit 401.

Modification 4 of Detection Switch

A detection switch in a modification 4 is included in the above-described modification 8 of the measurement system, which is described with reference to FIG. 1, FIG. 2, and FIG. 9. That is, the detection switch in the modification 4 is different from the detection switch (2, 3, 4, 4*a*) in the above-described first embodiment and second embodiment in that the vibration generator 20*c* that generates sound or vibration in accordance with pressure such as atmospheric pressure as an environment state quantity is provided in a vicinity of the vibration-driven energy harvesting unit 2. However, the other respects are the same as those in the detection switch (2, 3, 4, 4*a*) in the above-described first embodiment and second embodiment.

Since the configurations of the vibration-driven energy harvesting unit 2 and the vibration generator 20*c* have already been described, the description will be omitted.

As described above, when the pressure as an environment state quantity substantially exceeds a predetermined value, the pressure bulkhead 42 rapidly deforms into a shape convex toward the airtight space 44. This deformation causes the vibration-driven energy harvesting unit 2 to vibrate, and the vibration-driven energy harvesting unit 2 generates electric power from the vibration or sound that occurs by the vibration. Then, as described above, based on the electric power generated by the vibration-driven energy harvesting unit 2, the power supply controller 4 or the first power supply controller 4*a* in the measurement system 1 or 1*a* illustrated in FIG. 1 or FIG. 2 starts the supply of the electric power from the output terminal OUT.

In contrast, before the pressure reaches a predetermined value, the electric power generated by the vibration-driven energy harvesting unit 2 is weak, and thus the power supply controller 4 or the first power supply controller 4*a* interrupts the supply of the electric power from the output terminal OUT.

Therefore, the detection switch (2, 3, 4, 4*a*, 20*c*) in the modification 4 includes the vibration generator 20*c* that changes in shape with a change in pressure as an environment state quantity to generate sound or vibration. In addition, in the power supply controller 4 or 4*a*, the detecting unit 401 (see FIG. 13) that detects whether the output of the electric signal based on the electric power generated by the vibration-driven energy harvesting unit 2 from sound or vibration generated by the vibration generator 20*c* is greater than the predetermined value or equal to or less than the predetermined value is included. Further, the output controller 402 (see FIG. 13) in the power supply controller 4 or 4*a* controls the amount of the electric power supplied by the power supply 10 based on the result of the detection by the detecting unit 401.

It is thus possible to provide a detection switch that can detect a change in pressure as an environment state quantity, which is neither sound nor vibration, by being triggered by the change and that consumes a small amount of electric power from the power supply 10.

Modification 5 of Detection Switch

A detection switch in a modification 5 is included in the above-described modification 9 of the measurement system, which is described with reference to FIG. 1, FIG. 2, and FIG. 10. That is, the detection switch in the modification 5 is different from the detection switch (2, 3, 4, 4*a*) in the above-described first embodiment and second embodiment in that the vibration generator 20*d* that changes in shape with a change in flow rate as an environment state quantity to generate sound or vibration is provided in a vicinity of the vibration-driven energy harvesting unit 2. However, the other respects are the same as those in the detection switch (2, 3, 4, 4*a*) in the above-described first embodiment and second embodiment.

Since the configurations of the vibration-driven energy harvesting unit 2 and the vibration generator 20*d* have already been described, the description will be omitted.

As described above, when the flow rate of the fluid 61 flowing inside the pipe 60, as an environment state quantity, becomes substantially equal to or greater than a predetermined value, the shape of the curved plate 52 rapidly deforms into a shape convex toward the operation pin 25, so that the operation pin 25 collides with the vibration-driven energy harvesting unit 2. The vibration-driven energy harvesting unit 2 generates electric power from vibration or sound that occurs then.

Then, as described above, based on the electric power generated by the vibration-driven energy harvesting unit 2, the power supply controller 4 or the first power supply controller 4*a* in the measurement system 1 or 1*a* illustrated in FIG. 1 or FIG. 2 starts the supply of the electric power from the output terminal OUT.

In contrast, before the flow rate substantially reaches a predetermined value, the electric power generated by the vibration-driven energy harvesting unit 2 is weak, and thus the power supply controller 4 or the first power supply controller 4*a* interrupts the supply of the electric power from the output terminal OUT.

Therefore, the detection switch (2, 3, 4, 4*a*, 20*d*) in the modification 5 includes the vibration generator 20*d* that changes in shape with a change in flow rate as an environment state quantity to generate sound or vibration. In addition, in the power supply controller 4 or 4*a*, the detecting unit 401 (see FIG. 13) that detects whether the output of the electric signal based on the electric power generated by the vibration-driven energy harvesting unit 2 from sound or vibration generated by the vibration generator 20*d* is greater than the predetermined value or equal to or less than the predetermined value is included. Further, the output controller 402 (see FIG. 13) in the power supply controller 4 or 4*a* controls the amount of the electric power supplied by the power supply 10 based on the result of the detection by the detecting unit 401.

It is thus possible to provide a detection switch that can detect a change in flow rate as an environment state quantity, which is neither sound nor vibration, by being triggered by the change and that consumes a small amount of electric power from the power supply 10.

In the embodiments and modifications of the detection switch described above, the detection switch is supposed to include the holding circuit 3, but the detection switch need not include the holding circuit 3. As described above, in a case where the holding circuit 3 is not included, the output voltage V0 output from the vibration-driven energy harvesting unit 2 is input, as the first control signal, into the power supply controller 4 or the first power supply controller 4*a*.

In contrast, in a case where the detection switch includes the holding circuit 3, when vibration or sound in an environment causes the output voltage V0 of the vibration-driven energy harvesting unit 2 to increase to exceed the second voltage, the power supply controller 4 or 4*a* continues the supply of the electric power even when the output voltage V0 thereafter becomes equal to or lower than the second voltage. It is thus possible to provide a detection switch (2, 3, 4, 4*a*) that operates more stably.

In any one of the detection switches in the embodiments and modifications described above, a vibration detector that generates an electric signal in accordance with sound, vibration, or displacement may be employed in place of the above-described vibration-driven energy harvesting unit 2. The vibration detector includes, for example, an acceleration sensor or a displacement sensor and a second power supply.

As the acceleration sensor, a sensor that includes a detecting element of various types such as a capacitive detection type, a piezoresistance type, or a thermal convection type, and includes an amplifier circuit may be used.

As the second power supply, a primary battery, a secondary battery, or a combination of a secondary battery and a vibration-driven energy harvesting element may be used.

The electric signal that is generated by the detection by the acceleration sensor or the displacement sensor and amplification with electric power of the second power supply is input into the holding circuit 3 or the power supply controller 4 or 4*a* illustrated in FIG. 1 or FIG. 2.

It should be noted that the vibration-driven energy harvesting unit 2 is also included in an aspect of the vibration detector because the vibration-driven energy harvesting unit 2 generates an electric signal in accordance with sound, vibration, or displacement.

(Advantageous Effects of Detection Switch in Embodiments and Modifications)

(12) The detection switch in each of the above-described embodiments and modifications includes the vibration detector (2) that generates an electric signal in accordance with sound, vibration, or displacement and the detecting unit 401 that detects whether the output of the electric signal generated by the vibration detector (2) is greater than the predetermined value or equal to or less than the predetermined value.

With this configuration, it is possible to provide a detection switch of which a power consumption is reduced in a state where sound, vibration, or displacement being a state quantity does not fluctuate.

(13) The vibration detector may be the vibration-driven energy harvesting unit (2) that generates electric power from sound, vibration, or displacement. With this configuration, it is possible to provide a detection switch of which a power consumption is further reduced in a state where sound, vibration, or displacement being a state quantity does not fluctuate.

(14) By further including the output controller 402 that controls the amount of the electric power supplied by the power supply 10 based on the result of the detection by the detecting unit 401, it is possible to reduce the power consumption of the power supply 10, increase a maintenance interval (a period required until replacement or recharging) of the power supply 10, and reduce a cost necessary for maintenance of the power supply 10.

(15) The power supply controller 4 or 4*a* may be configured to control, based on the result of the detection of the electric signal generated by the vibration detector (2) by the detecting unit, whether to output the electric power supplied by the power supply 10 to the output terminal OUT or to interrupt the output to the output terminal OUT. With this configuration, it is possible to further reduce the power consumption of the power supply 10 in the standby state.

(16) One of the vibration generators 20 and 20*a* to 20*d* that generates sound or vibration in accordance with a change in an environment state quantity may be further included, and the power supply controller 4 or 4*a* may be configured to control the amount of the electric power supplied by the power supply based on the electric signal generated by the vibration detector (2) from the sound or the vibration generated by the one of the vibration generators 20 and 20*a* to 20*d*. It is thus possible to provide a detection switch that can detect a change in an environment state quantity other than sound or vibration, by being triggered by the change and that consumes a small amount of electric power from the power supply 10.

Various embodiments and modifications have been described above, but the present disclosure is not limited to these details. The embodiments and the modifications may be each applied alone or may be used in combination. Other embodiments contemplated within the scope of the technical concept of the present disclosure are also included within the scope of the present disclosure.

The disclosure of the following priority application is incorporated herein by reference.

Japanese Patent Application No. 2019-221404 (filed on Dec. 6, 2019)

Japanese Patent Application No. 2020-15377 (filed on Jan. 31, 2020)

REFERENCE SIGNS LIST

1, 1*a*, 1*b*, 1*c* measurement system, 2, 2*a* vibration-driven energy harvesting unit, 3 holding circuit, 4, 40 power supply controller, 5 controller, 5*a* signal processor, 5*b*, 5*c* control signal generator, 6 detector, 7 transmitter, 4*a* first power supply control element, 8 second power supply control element, 9 third power supply control element, 10 power supply, 11 vibration-driven energy harvesting element, 12 sensor, 13 detection circuit, 14 communication circuit, 15 antenna, 16 timer IC, 30 railroad crossing signal, 31 warning sound emitter, 32 warning sound, 35 railroad crossing gate, 36 crossing bar, 37 rotation mechanism, 70 receiving system 100 diagnostic system, 90 detection switch, 401 detecting unit, 402 output controller

The invention claimed is:

1. A measurement system comprising:

a vibration-driven energy harvesting unit that generates electric power from sound, vibration, or displacement;

a power supply controller that controls an amount of power consumption of a power supply based on the electric power generated by the vibration-driven energy harvesting unit;

a detector that is driven by electric power supplied by the power supply controller and detects an environment state quantity; and a transmitter that is driven by electric power supplied by the power supply controller and transmits information regarding the environment state quantity detected by the detector, wherein an input terminal of the power supply controller is connected to the power supply, and a control terminal of the power supply controller is connected to the vibration-driven energy harvesting unit, the power supply controller supplies electric power of the power supply when an output voltage of the vibration-driven energy harvesting unit exceeds a predetermined value.

2. The measurement system according to claim 1, further comprising a signal processor that is driven by electric power supplied by the power supply controller, extracts predetermined information included in the environment state quantity detected by the detector, and conveys the predetermined information to the transmitter.

3. The measurement system according to claim 2, wherein the power supply controller includes:

a first power supply controller that controls an amount of power consumption of the signal processor based on the electric power generated by the vibration-driven energy harvesting unit;

a control signal generator that generates a first control signal and a second control signal based on a voltage of the electric power supplied from the first power supply controller to the signal processor; and a second power supply controller that controls an amount of power consumption of the detector based on the first control signal and a third power supply controller that controls an amount of power consumption of the transmitter based on the second control signal.

4. The measurement system according to claim 2, wherein the power supply controller supplies a predetermined amount of electric power when a first control signal based on the electric power generated by the vibration-driven energy harvesting unit exceeds a first voltage and supplies electric power smaller than the predetermined amount or does not supply the electric power when the first control signal is equal to or lower than the first voltage.

5. The measurement system according to claim 4, wherein the power supply controller continues supplying a predetermined amount of electric power for a predetermined time period when the first control signal based on the electric power generated by the vibration-driven energy harvesting unit exceeds the first voltage.

6. The measurement system according to claim 4, wherein the power supply controller controls amounts of power consumption of the detector, the transmitter, and the signal processor individually based on the first control signal.

7. The measurement system according to claim 6, wherein when the first control signal is equal to or lower than the first voltage, the power supply controller reduces the amounts of power consumption of the detector, the transmitter, and the signal processor to equal to or less than 1/10 of the amounts of power consumption of a case where the first control signal exceeds the first voltage.

8. The measurement system according to claim 4, further comprising a holding circuit that outputs the first control signal based on the electric power generated by the vibration-driven energy harvesting unit, wherein the power supply controller controls the amount of power consumption of the power supply based on the first control signal, and the holding circuit continues outputting the first control signal of which a voltage is equal to or lower than the first voltage unless an output voltage of the vibration-driven energy harvesting unit exceeds a second voltage, and continues outputting the first control signal of which the voltage is higher than the first voltage when the output voltage of the vibration-driven energy harvesting unit exceeds the second voltage.

9. The measurement system according to claim 8, wherein the holding circuit is set to a state of outputting the first control signal of which the voltage is equal to or lower than the first voltage by inputting a second control signal into the holding circuit.

10. The measurement system according to claim 1, wherein the transmitter is a wireless transmitter that performs transmission wirelessly.

11. The measurement system according to claim 1, wherein the vibration-driven energy harvesting unit has an electric power generation efficiency that is higher for sounds or vibrations of a predetermined frequency band than for sounds or vibrations with other frequencies.

12. The measurement system according to claim 1, wherein the detector is a sound detector that detects sound as the environment state quantity, and the vibration-driven energy harvesting unit vibrates by the sound detected as the environment state quantity to generate electric power.

13. The measurement system according to claim 1, wherein the detector is an attitude detector that detects an attitude of the detector, as the environment state quantity.

14. The measurement system according to claim 1, wherein the vibration-driven energy harvesting unit generates electric power from sound or vibration.

15. The measurement system according to claim 1, further comprising a vibration generator that generates sound or vibration in accordance with the environment state quantity, wherein the vibration-driven energy harvesting unit generates electric power from the sound or vibration generated by the vibration generator.

16. The measurement system according to claim 15, wherein the environment state quantity includes any one or more of temperature, pressure, and flow rate, and the vibration generator includes a member that changes in shape with a change in the temperature, the pressure, or the flow rate to generate sound or vibration.

17. The measurement system according to claim 1, wherein the power supply includes an energy harvesting device.

18. The measurement system according to claim 1, wherein the power supply is constituted by an energy harvesting device.

19. A diagnostic system comprising:

the measurement system according to claim 1 that is disposed in a vicinity of a diagnosis object; and a receiving system that receives a signal transmitted from the measurement system and diagnoses a status of the diagnosis object based on the signal.

* * * * *